US012733051B2

(12) United States Patent
Ozturk et al.

(10) Patent No.: US 12,733,051 B2
(45) Date of Patent: Sep. 8, 2026

(54) COORDINATION OF MULTIPLE CONNECTIONS WITH A USER EQUIPMENT USING MULTIPLE SUBSCRIPTIONS

(71) Applicant: QUALCOMM Incorporated, San Diego, CA (US)

(72) Inventors: Ozcan Ozturk, San Diego, CA (US); Gavin Bernard Horn, La Jolla, CA (US); Punyaslok Purkayastha, San Diego, CA (US); Juan Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 503 days.

(21) Appl. No.: 18/011,797

(22) PCT Filed: Aug. 7, 2020

(86) PCT No.: PCT/CN2020/107699

§ 371 (c)(1),
(2) Date: Dec. 20, 2022

(87) PCT Pub. No.: WO2022/027553

PCT Pub. Date: Feb. 10, 2022

(65) Prior Publication Data

US 2023/0247701 A1 Aug. 3, 2023

(51) Int. Cl.
*H04W 76/15* (2018.01)
*H04W 8/18* (2009.01)

(52) U.S. Cl.
CPC ........... *H04W 76/15* (2018.02); *H04W 8/183* (2013.01)

(58) Field of Classification Search
None
See application file for complete search history.

(56) References Cited

U.S. PATENT DOCUMENTS 9,338,713 B2 5/2016 Chakravarthy et al.
2015/0023217 A1 1/2015 Hu et al.
(Continued)

FOREIGN PATENT DOCUMENTS

WO 2015051157 4/2015
WO 2018141081 8/2018

OTHER PUBLICATIONS

Intel, et al., "Definition for Devices Supporting Multiple USIMs", 3GPP TSG-SA WG 1 Meeting #87, S1-192096, Sophia-Antipolis, FR, 20190819-20190823, 3 Pages, Aug. 23, 2019 (Aug. 23, 2019) the whole document.
(Continued)

*Primary Examiner* — Kouroush Mohebbi
(74) *Attorney, Agent, or Firm* — QUALCOMM Incorporated

(57) ABSTRACT

Aspects relate to coordination of communication links associated with multiple subscriptions. For example, a base station may determine that a first communication link and a second communication link are established with a user equipment (UE) using a first subscription and a second subscription of the UE, respectively. At least one of the first communication link or the second communication link may be established between the UE and the base station. The base station may coordinate communication of information with the UE via at least one of the first communication link or the second communication link based on the determination. The base station may coordinate the communication of information by selecting, based on the information, one of: the first communication link and the second communication link for communicating the information, or the first communication link or the second communication link for communicating the information without utilizing the other communication link.

35 Claims, 10 Drawing Sheets

(56) References Cited

U.S. PATENT DOCUMENTS

| | | | | |
|---|---|---|---|---|
| 2015/0023258 | A1* | 1/2015 | Hu | H04W 76/15 370/328 |
| 2015/0065106 | A1* | 3/2015 | Catovic | H04W 88/06 455/418 |
| 2016/0219648 | A1* | 7/2016 | Awoniyi-Oteri | H04W 8/24 |
| 2017/0289958 | A1* | 10/2017 | Dev | H04W 60/00 |
| 2020/0236595 | A1 | 7/2020 | Cuevas Ramirez et al. | |
| 2021/0282103 | A1* | 9/2021 | Zhu | H04W 76/15 |

OTHER PUBLICATIONS

International Search Report and Written Opinion—PCT/CN2020/107699—ISA/EPO—May 7, 2021.

Supplementary European Search Report—EP20948019—Search Authority—Berlin—Apr. 12, 2024.

* cited by examiner

1000

START

1002 Establish a first communication link with a base station using a first subscription 1004 Establish a second communication link with one of the base station or a second base station using a second subscription 1006 Transmit first UE identification information associated with the first communication link and second UE identification information associated with the second communication link via one of the first communication link and the second communication link 1008 Coordinate communication of information via at least one of the first communication link or the second communication link, wherein the coordinating the communication comprises selecting, based on the information, one of:
(a) the first communication link and the second communication link for communicating the information, or
(b) the first communication link or the second communication link for communicating the information without utilizing the other communication link 1010 Communicate the information via the selected first communication link and/or second communication link

END

FIG. 10

COORDINATION OF MULTIPLE CONNECTIONS WITH A USER EQUIPMENT USING MULTIPLE SUBSCRIPTIONS

CROSS-REFERENCE TO RELATED APPLICATION(S)

This application for patent is a U.S. National Stage entry of PCT Patent Application No. PCT/CN2020/107699 filed 7 Aug. 2020, and assigned to the assignee hereof and hereby expressly incorporated by reference herein as if fully set forth below in its entirety and for all applicable purposes.

TECHNICAL FIELD

The technology discussed below relates generally to wireless communication systems, and more particularly, to coordination of multiple connections using multiple subscriptions with a user equipment configured to utilize the multiple subscriptions.

INTRODUCTION

A user equipment (UE) often uses a subscription to connect to a service network, which provides one or more services such as a voice call service or a data service. For example, a subscription used by the UE may be associated with a subscription module or device such as a subscription identification module (SIM) that the UE accesses to use the subscription. With development of the subscription based services, a UE that is capable of using two or more subscriptions are increasingly used. In one example, a UE may implement a dual SIM that allows the UE to connect to a service network using two different subscriptions respectively provided by two SIMs. Various Improvements for a UE configured to use multiple subscriptions are being studied.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to coordinating communication using multiple communication links established between a user equipment (UE) and one or more base stations using multiple subscriptions of the UE. Depending on information to be communicated, use of the communication links may be coordinated differently to optimize the communication of the information. For example, depending on the information to be communicated, one of the communication links may be used without utilizing the other communication links, or multiple communication links may be used, to communicate the information.

In one example, a method of wireless communication by a base station is disclosed. The method includes determining that a first communication link and a second communication link are established with a user equipment (UE) using a first subscription and a second subscription of the UE, respectively, wherein at least one of the first communication link or the second communication link is established between the UE and the base station, coordinating communication of information with the UE via at least one of the first communication link or the second communication link based on the determination, wherein coordinating the communication of information comprises selecting, based on the information, one of (a) the first communication link and the second communication link for communicating the information, or (b) the first communication link or the second communication link for communicating the information without utilizing the other communication link, and communicating the information with the UE via the selected first communication link and/or second communication link.

In an aspect, the determining that the first communication link and the second communication link are established with the UE may include receiving first UE identification information associated with the first communication link and second UE identification information associated with the second communication link via one of the first communication link and the second communication link, and determining that the first and second communication links are associated with the UE in response to determining that the first UE identification information and the second UE identification information are received via the one of the first communication link and the second communication link.

In an aspect, the first UE identification information may include at least one of a first radio network temporary identifier (RNTI) or a first serving temporary mobile subscriber identity (S-TMSI) associated with the first subscription and the second UE identification information may include at least one of a second RNTI or a second S-TMSI associated with the second subscription. In an aspect, the first RNTI may be a first cell RNTI (C-RNTI) and the second RNTI may be a second C-RNTI.

In an aspect, the first communication link may be established between the UE and the base station and the second communication link may be established between the UE and one of the base station and a second base station. In an aspect, the base station may be associated with a first primary cell (PCell) and the second base station may be associated with a second PCell. In an aspect, the first communication link may be established between the UE and a first distribution unit of the base station, and the second communication link may be established between the UE and one of the first distribution unit and a second distribution unit of the base station.

In an aspect, the information may include first data to be scheduled for the first communication link and second data to be scheduled for the second communication link. In this aspect, the coordinating the information may include scheduling the UE to communicate the first data via the first communication link during a first time period, and scheduling the UE to communicate the second data via the second communication link during a second time period different from the first time period.

In an aspect, the information may include at least one of a radio link monitoring (RLM) signal or radio resource management (RRM) information used for the first subscription and the second subscription. In this aspect, the communicating the information may include transmitting at least one of the RLM signal or the RRM information to the UE via the one of the first communication link and the second communication link.

In an aspect, the information may include a first handover command and a second handover command, the first handover command requesting the UE to perform a first handover from the base station to a target base station using the first subscription, and the second handover command requesting the UE to perform a second handover from the base station to the target base station using the second subscription. In this aspect, the communicating the information may include transmitting the first handover command to the UE via the first communication link using the first subscription during a first time period, and transmitting the second handover command to the UE via the second communication link using the second subscription during a second time period which substantially overlaps with the first time period. In an aspect, at least one of the first handover or the second handover may be a dual active protocol stack (DAPS) handover. In an aspect, the first handover command and the second handover command are for a conditional handover to the target base station.

In an aspect, the first communication link may be connected to a first secondary cell (SCell) using the first subscription, and the second communication link may be connected to a second SCell different from the first SCell using the second subscription.

In an aspect, the information may include at least one of a first configured grant (CG) or a first semipersistent scheduling (SPS) configuration associated with the first subscription and at least one of a second CG or a second semipersistent scheduling (SPS) configuration associated with the second subscription. In this aspect, the communicating the information may include transmitting the at least one of the first CG or the first SPS configuration to the UE via the first communication link using the first subscription during a first time period, and transmitting the at least one of the second CG or the SPS configuration to the UE via the second communication link using the second subscription during a second time period different from the first time period.

In an aspect, the information may include at least one of a first physical uplink control channel (PUCCH) information or a first sounding reference signal (SRS) configuration associated with the first subscription and at least one of a second PUCCH information or a second SRS configuration associated with the second subscription. In this aspect, the communicating the information may include transmitting the at least one of the first PUCCH or the first SRS configuration to the UE via the first communication link using the first subscription based on time division multiplexing, and transmitting the at least one of the second PUCCH or the second SRS configuration to the UE via the second communication link using the second subscription based on the time division multiplexing.

In an aspect, the information may include a sounding reference signal (SRS) configuration associated with the first subscription and the second subscription. In this aspect, the communicating the information may include transmitting the SRS configuration to the UE via the one of the first communication link and the second communication link.

In an aspect, the information may include system information associated with the base station. In this aspect, the communicating the information may include transmitting the system information via the one of the first communication link and the second communication link.

In an aspect, the information may include at least one of a public warning system (PWS) message or an in-device coexistence (IDC) indication associated with the first subscription and the second subscription. In this aspect, the communicating the information may include transmitting the at least one of the PWS message or the IDC indication to the UE via one of the first communication link and the second communication link In an aspect, the first communication link may be established using a first protocol stack of the base station, the first protocol stack including a first layer 1, a first layer 2, and a first layer 3, and the second communication link may be established using a second protocol stack of the base station that may be different from the first protocol stack, the second protocol stack including a second layer 1, a second layer 2, and a second layer 3.

In another example, a base station for wireless communication may be disclosed. The base station may include at least one processor, a transceiver communicatively coupled to the at least one processor, and a memory communicatively coupled to the at least one processor. The at least one processor may be configured to determine that a first communication link and a second communication link are established with a user equipment (UE) using a first subscription and a second subscription of the UE, respectively, wherein at least one of the first communication link or the second communication link may be established between the UE and the base station, coordinate communication of information with the UE via at least one of the first communication link or the second communication link based on the determination, wherein coordinating the communication of information comprises selecting, based on the information, one of (a) the first communication link and the second communication link for communicating the information, or (b) the first communication link or the second communication link for communicating the information without utilizing the other communication link, and communicate the information with the UE via the selected first communication link and/or second communication link.

In another example, a non-transitory processor-readable storage medium having instructions thereon for a base station may be disclosed. The instructions, when executed by a processing circuit, cause the processing circuit to determine that a first communication link and a second communication link are established with a user equipment (UE) using a first subscription and a second subscription of the UE, respectively, wherein at least one of the first communication link or the second communication link may be established between the UE and the base station, coordinate communication of information with the UE via at least one of the first communication link or the second communication link based on the determination, wherein coordinating the communication of information comprises selecting, based on the information, one of (a) the first communication link and the second communication link for communicating the information, or (b) the first communication link or the second communication link for communicating the information without utilizing the other communication link, and communicate the information with the UE via the selected first communication link and/or second communication link.

In a further example, a base station for wireless communication may be disclosed. The base station includes means for determining that a first communication link and a second communication link are established with a UE using a first subscription and a second subscription of the UE, respectively, wherein at least one of the first communication link or the second communication link may be established between the UE and the base station, means for coordinating communication of information with the UE via at least one of the first communication link or the second communication link based on the determination, wherein coordinating the communication of information comprises selecting, based on the information, one of (a) the first communication link and the second communication link for communicating the information, or (b) the first communication link or the second communication link for communicating the information without utilizing the other communication link, and means for transmitting the information to the UE via the selected first communication link and/or second communication link.

In one example, a method of wireless communication by a UE may be disclosed. The method includes establishing a first communication link with a base station using a first subscription, establishing a second communication link with one of the base station or a second base station using a second subscription, coordinating communication of information via at least one of the first communication link or the second communication link, wherein the coordinating the communication comprises selecting, based on the information, one of (a) the first communication link and the second communication link for communicating the information, or (b) the first communication link or the second communication link for communicating the information without utilizing the other communication link, and communicating the information via at least one of the first communication or the second communication based on the coordinating.

In an aspect, the method may further include transmitting first UE identification information associated with the first communication link and second UE identification information associated with the second communication link via one of the first communication link and the second communication link. In this aspect, the coordinating the communication may be in response to transmitting the first UE identification information and the second UE identification information via the one of the first communication link and the second communication link.

In an aspect, the first UE identification information may include at least one of a first RNTI or a first S-TMSI associated with the first subscription and the second UE identification information may include at least one of a second RNTI or a second S-TMSI associated with the second subscription. In an aspect, the first RNTI may be a first cell RNTI (C-RNTI) and the second RNTI may be a second C-RNTI.

In an aspect, the base station may be associated with a first primary cell (PCell) and the second base station may be associated with a second PCell. In an aspect, the first communication link may be established between the UE and a first distribution unit of the base station, and the second communication link may be established between the UE and one of the first distribution unit and a second distribution unit of the base station.

In an aspect, the information may include a cell identification information associated with the second base station. In this aspect, the communicating the information may include transmitting the cell identification information to the base station via the one of the first communication link and the second communication link.

In an aspect, the information may include an RRC status report associated with at least one of the first communication link or the second communication link. In this aspect, the communicating the information may include transmitting the RRC status report via one of the first communication link and the second communication link.

In an aspect, the information may include UE radio access network (RAN) capability information associated with the UE. In this aspect, the communicating the information may include transmitting the UE RAN capability information via the one of the first communication link and the second communication link.

In an aspect, the information may include at least one of radio link monitoring (RLM) signal for monitoring a link quality or one or more reference signals associated with one or more beams. In this aspect, the communicating the information may include receiving the at least one of the RLM signal or the one or more reference signals via the one of the first communication link and the second communication link. In an aspect, the communicating the information may further include performing at least one of: monitoring a condition of at least one of the first communication link or the second communication link based on the RLM signal, or monitoring a condition of the one or more beams based on the one or more reference signals.

In an aspect, the information may include at least one of a public warning system (PWS) message, system information (SI) associated with the base station, or an in-device coexistence (IDC) indication associated with the first subscription and the second subscription. In this aspect, the communicating the information may include receiving the at least one of the PWS message, the SI, or the IDC indication to the UE via one of the first communication link and the second communication link. In an aspect, the communicating the information may further include monitoring for at least one of a change in the system information or the PWS message on one of the first communication link and the second communication link.

In an aspect, the information may include UE assistance information (UAI) associated with the UE. In this aspect, the communicating the information may include transmitting the UAI via the one of the first communication link and the second communication link.

In an aspect, the first communication link may be established using a first protocol stack of the UE, the first protocol stack including a first layer 1, a first layer 2, and a first layer 3, and the second communication link may be established using a second protocol stack of the UE that may be different from the first protocol stack, the second protocol stack including a second layer 1, a second layer 2, and a second layer 3.

In another example, a UE for wireless communication may be disclosed. The base station may include at least one processor, a transceiver communicatively coupled to the at least one processor, and a memory communicatively coupled to the at least one processor. The at least one processor may be configured to establish a first communication link with a base station using a first subscription, establish a second communication link with one of the base station or a second base station using a second subscription, coordinate communication of information via at least one of the first communication link or the second communication link, wherein the coordinating the communication comprises selecting, based on the information, one of (a) the first communication link and the second communication link for communicating the information, or (b) the first communication link or the second communication link for communicating the information without utilizing the other communication link, and communicate the information via at least one of the first communication or the second communication based on the coordinating.

In another example, a non-transitory processor-readable storage medium having instructions thereon for a UE may be disclosed. The instructions, when executed by a processing circuit, cause the processing circuit to establish a first communication link with a base station using a first subscription, establish a second communication link with one of the base station or a second base station using a second subscription, coordinate communication of information via at least one of the first communication link or the second communication link, wherein the coordinating the communication comprises selecting, based on the information, one of (a) the first communication link and the second communication link for communicating the information, or (b) the first communication link or the second communication link for communicating the information without utilizing the other communication link, and communicate the information via at least one of the first communication or the second communication based on the coordinating.

In a further example, a UE for wireless communication may be disclosed. The base station includes means for establishing a first communication link with a base station using a first subscription, means for establishing a second communication link with one of the base station or a second base station using a second subscription, means for coordinating communication of information via at least one of the first communication link or the second communication link, wherein the coordinating the communication comprises selecting, based on the information, one of (a) the first communication link and the second communication link for communicating the information, or (b) the first communication link or the second communication link for communicating the information without utilizing the other communication link, and means for communicating the information via at least one of the first communication or the second communication based on the coordinating.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 10 is a flow chart illustrating an exemplary process for wireless communication by a user equipment, according to some aspects of the disclosure.

DETAILED DESCRIPTION

Figure 1:
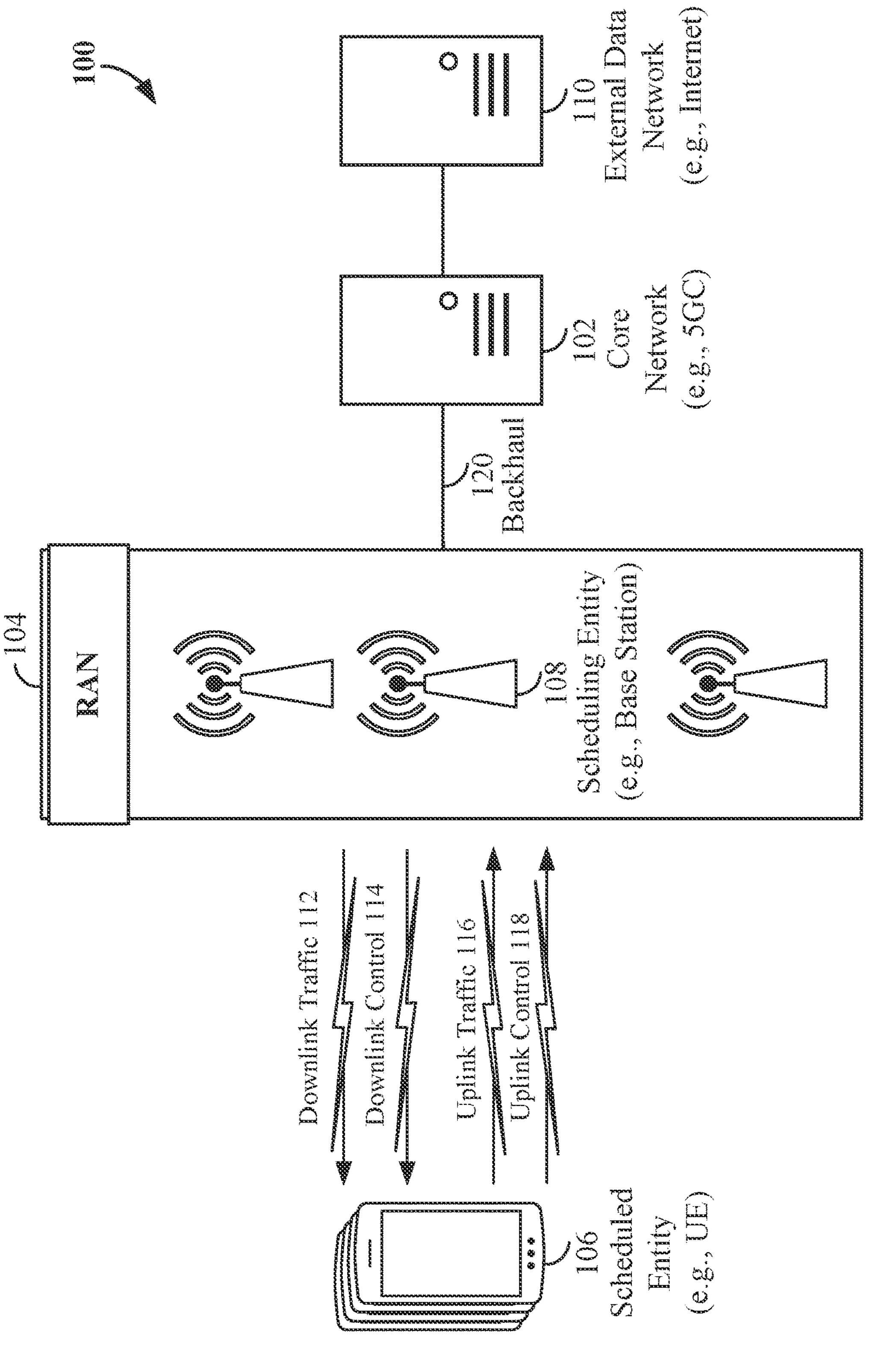
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices. AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

A UE capable of communicating using multiple subscriptions has been developed. For example, a UE may include multiple subscription identification modules (SIMs) that may be used to communicate using multiple subscriptions, respectively. The UE may use the multiple subscriptions to establish multiple communication links with one or more base stations. In a case where multiple communication links associated with multiple subscriptions are originating from the same UE, there may be areas for optimization when performing communication using one or more of the communication links.

According to aspects of the disclosure, when a base station determines that multiple communication links associated with multiple subscriptions are originating from the same UE, the base station may coordinate use of the multiple communication links based on a particular information to be communicated, in order to optimize communication of the particular information. In an aspect, depending on the information to be communicated, one of the communication links may be used without utilizing the other communication links, or multiple communication links may be used, to communicate the information. For example, a certain type of information may be substantially same across the multiple communication links/subscriptions, and thus may be communicated once using one of the multiple communication links. For example, another type of information may need to be transmitted using the multiple communication links, and may need to be transmitted at different times using the multiple communication links to avoid data collision.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3' Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information. e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
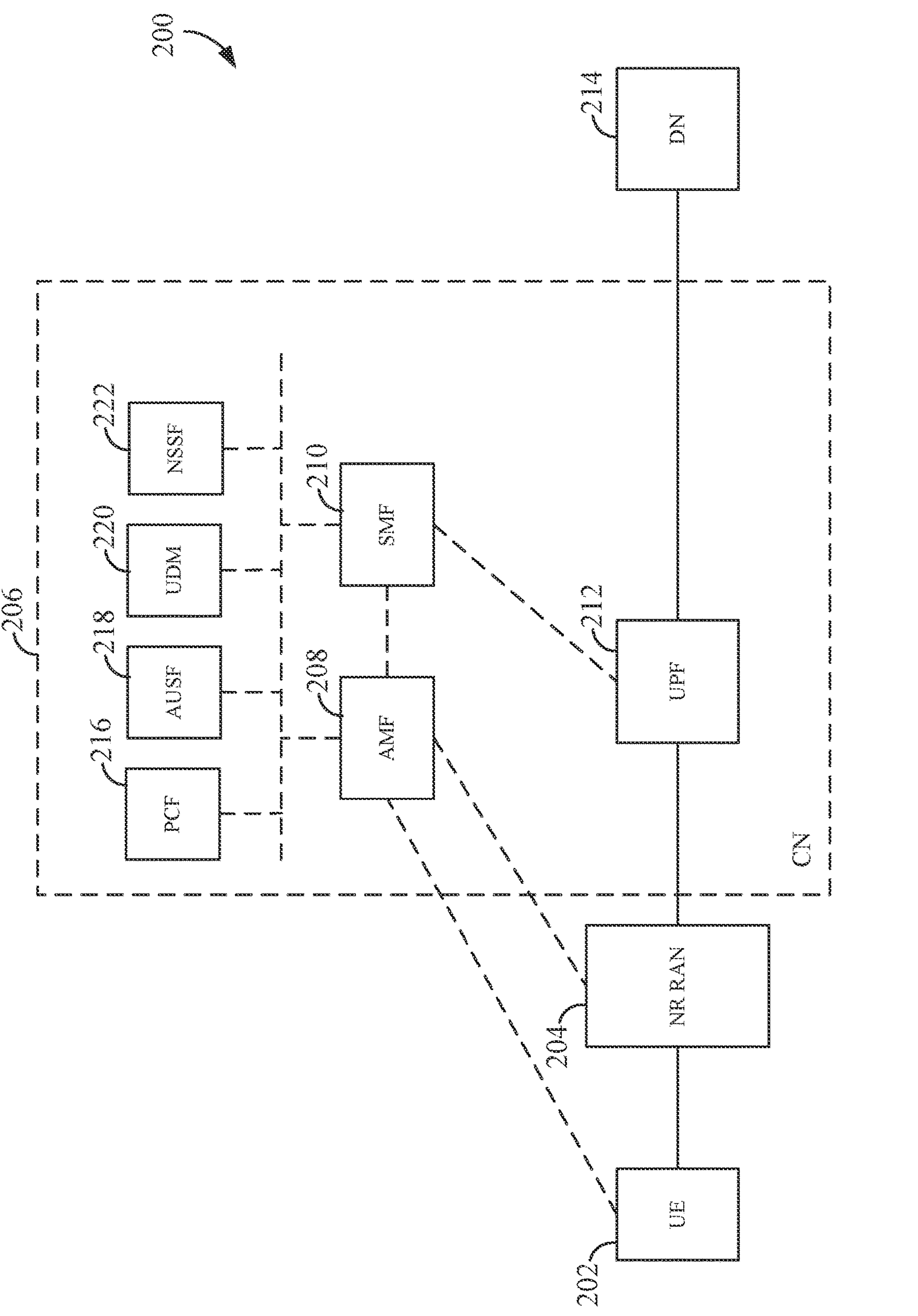
FIG. 2 is a block diagram illustrating an example of a 5G wireless communication system (5GS).

Referring now to FIG. 2, by way of example and without limitation, a block diagram illustrating an example of various components of a 5G wireless communication system (5GS) 200 is provided. In some examples, the 5GS 200 may be the same wireless communication system 100 described above and illustrated in FIG. 1. The 5GS 200 includes a user equipment (UE) 202, a NR RAN 204, and a core network 206. By virtue of the wireless communication system 200, the UE 202 may be enabled to carry out data communication with an external data network 214, such as (but not limited to) the Internet. Ethernet network, an IP multimedia subsystem (IMS) network, or a local area network.

The core network 206 may include, for example, an access and mobility management function (AMF) 208, a session management function (SMF) 210, and a user plane function (UPF) 212. The AMF 208 and SMF 210 employ control plane (e.g., Non Access Stratum (NAS)) signaling to perform various functions related to mobility management and session management for the UE 202. For example, the AMF 208 provides connectivity, mobility management and authentication of the UE 202, while the SMF 210 provides session management of the UE 202 (e.g., processes signaling related to protocol data unit (PDU) sessions between the UE 202 and the external DN 214). The UPF 212 provides user plane connectivity to route 5G (NR) packets to/from the UE 202 via the NR RAN 204.

The core network 206 may further include other functions, such as a policy control function (PCF) 216, authentication server function (AUSF) 218, unified data management (UDM) 220, network slice selection function (NSSF) 222, and other functions (not illustrated, for simplicity). The PCF 216 provides policy information (e.g., rules) for control plane functions, such as network slicing, roaming, and mobility management. In addition, the PCF 216 supports 5G quality of service (QoS) policies, network slice policies, and other types of policies. The AUSF 218 performs authentication of UEs 202. The UDM 220 facilitates generation of authentication and key agreement (AKA) credentials, performs user identification and manages subscription information and UE context. In some examples, the AMF 208 includes a co-located security anchor function (SEAF) that allows for re-authentication of a UE 202 when the UE moves between different NR RANs 204 without having to perform a complete authentication process with the AUSF 218. The NSSF 222 redirects traffic to a network slice. Network slices may be defined, for example, for different classes of subscribers or use cases, such as smart home, Internet of Things (IoT), connected car, smart energy grid, etc. Each use case may receive a unique set of optimized resources and network topology (e.g., a network slice) to meet the connectivity, speed, power, and capacity requirements of the use case.

To establish a connection to the 5G core network 206 via the NR RAN 204, the UE 202 may transmit a registration request and PDU session establishment request to the 5G core network 206 via the NR RAN 204. The AMF 208 and SMF 210 may process the registration request and PDU session establishment request and establish a PDU session between the UE 202 and the external DN 214 via the UPF 212. A PDU session may include one or more sessions (e.g., data sessions or data flows) and may be served by multiple UPFs 212 (only one of which is shown for convenience). Examples of data flows include, but are not limited to, IP flows, Ethernet flows and unstructured data flows.

Figure 3:
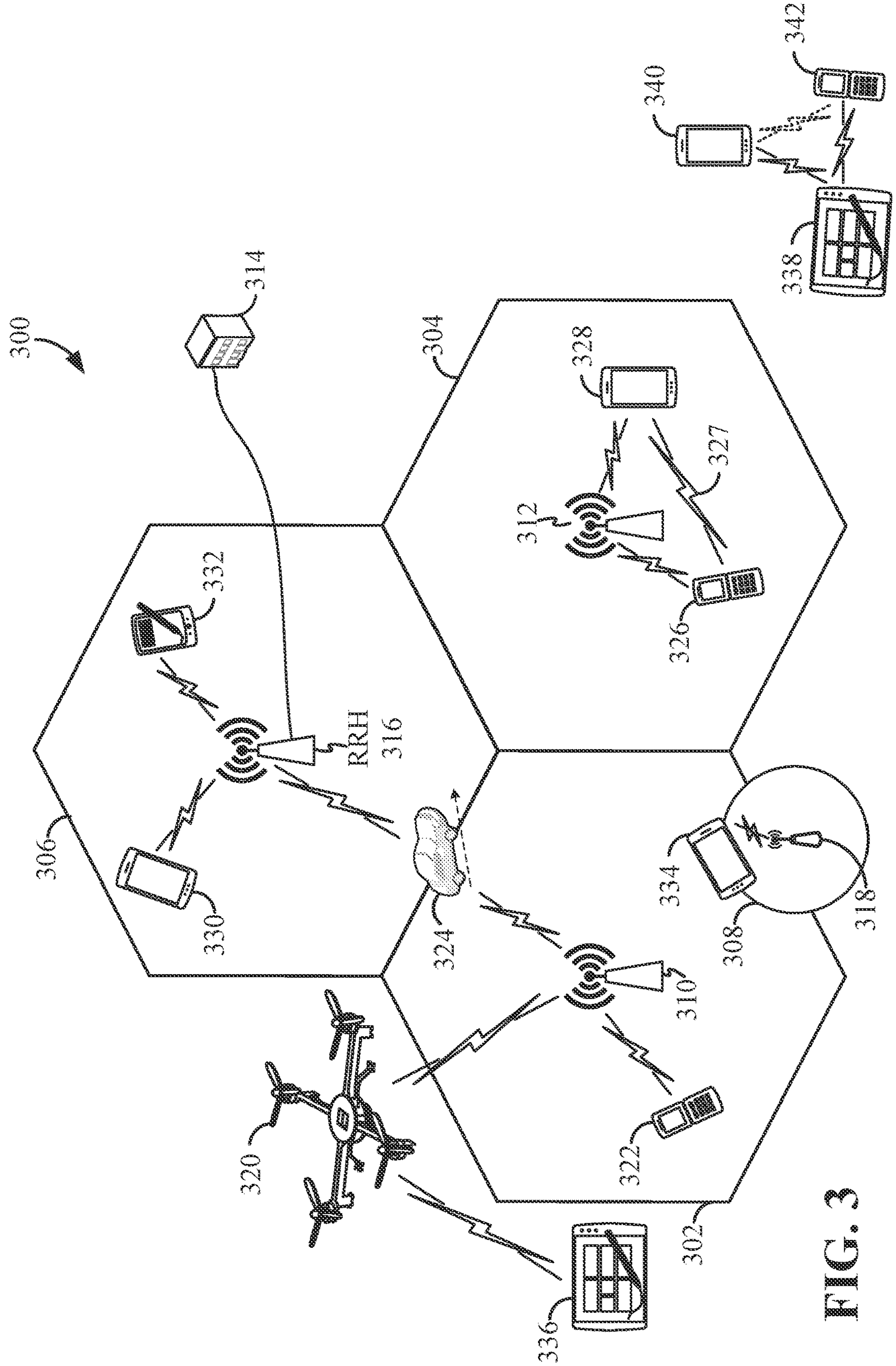
FIG. 3 is a conceptual illustration of an example of a radio access network according to some aspects.

Referring now to FIG. 3, by way of example and without limitation, a schematic illustration of a RAN 300 is provided. In some examples, the RAN 300 may be the same as the RAN 104 described above and illustrated in FIG. 1 and/or the NR RAN 204 described above and illustrated in FIG. 2. The geographic area covered by the RAN 300 may be divided into cellular regions (cells) that can be uniquely identified by a user equipment (UE) based on an identification broadcasted from one access point or base station. FIG. 3 illustrates macrocells 302, 304, and 306, and a small cell 308, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 3, two base stations 310 and 312 are shown in cells 302 and 304; and a third base station 314 is shown controlling a remote radio head (RRH) 316 in cell 306. That is, a base station can have an integrated antenna or can be connected to an antenna or RRH by feeder cables. In the illustrated example, the cells 302, 304, and 126 may be referred to as macrocells, as the base stations 310, 312, and 314 support cells having a large size. Further, a base station 318 is shown in the small cell 308 (e.g., a microcell, picocell, femtocell, home base station, home Node B, home eNode B, etc.) which may overlap with one or more macrocells. In this example, the cell 308 may be referred to as a small cell, as the base station 318 supports a cell having a relatively small size. Cell sizing can be done according to system design as well as component constraints.

It is to be understood that the radio access network 300 may include any number of wireless base stations and cells. Further, a relay node may be deployed to extend the size or coverage area of a given cell. The base stations 310, 312, 314, 318 provide wireless access points to a core network for any number of mobile apparatuses. In some examples, the base stations 310, 312, 314, and/or 318 may be the same as the base station/scheduling entity 108 described above and illustrated in FIG. 1.

FIG. 3 further includes a quadcopter or drone 320, which may be configured to function as a base station. That is, in some examples, a cell may not necessarily be stationary, and the geographic area of the cell may move according to the location of a mobile base station such as the quadcopter 320.

Within the RAN 300, the cells may include UEs that may be in communication with one or more sectors of each cell. Further, each base station 310, 312, 314, 318, and 320 may be configured to provide an access point to a core network 102 (see FIG. 1) for all the UEs in the respective cells. For example, UEs 322 and 324 may be in communication with base station 310; UEs 326 and 328 may be in communication with base station 312; UEs 330 and 332 may be in communication with base station 314 by way of RRH 316; UE 334 may be in communication with base station 318; and UE 336 may be in communication with mobile base station 320. In some examples, the UEs 322, 324, 326, 328, 330, 332, 334, 336, 338, 340, and/or 342 may be the same as the UE/scheduled entity 106 described above and illustrated in FIG. 1.

In some examples, a mobile network node (e.g., quadcopter 320) may be configured to function as a UE. For example, the quadcopter 320 may operate within cell 302 by communicating with base station 310.

In a further aspect of the RAN 300, sidelink signals may be used between UEs without necessarily relying on scheduling or control information from a base station. For example, two or more UEs (e.g., UEs 326 and 328) may communicate with each other using peer to peer (P2P) or sidelink signals 327 without relaying that communication through a base station (e.g., base station 312). In a further example, UE 338 is illustrated communicating with UEs 340 and 342. Here, the UE 338 may function as a scheduling entity or a primary sidelink device, and UEs 340 and 342 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example UEs 340 and 342 may optionally communicate directly with one another in addition to communicating with the scheduling entity 338. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 300, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 300 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 324 (illustrated as a vehicle, although any suitable form of UE may be used) may move from the geographic area corresponding to its serving cell 302 to the geographic area corresponding to a neighbor cell 306. When the signal strength or quality from the neighbor cell 306 exceeds that of its serving cell 302 for a given amount of time, the UE 324 may transmit a reporting message to its serving base station 310 indicating this condition. In response, the UE 324 may receive a handover command, and the UE may undergo a handover to the cell 306.

In a network configured for UL-based mobility, UL reference signals from each UE may be utilized by the network to select a serving cell for each UE. In some examples, the base stations 310, 312, and 314/216 may broadcast unified synchronization signals (e.g., unified Primary Synchronization Signals (PSSs), unified Secondary Synchronization Signals (SSSs) and unified Physical Broadcast Channels (PBCH)). The UEs 322, 324, 326, 328, 330, and 332 may receive the unified synchronization signals, derive the carrier frequency and slot timing from the synchronization signals, and in response to deriving timing, transmit an uplink pilot or reference signal. The uplink pilot signal transmitted by a UE (e.g., UE 324) may be concurrently received by two or more cells (e.g., base stations 310 and 314/216) within the radio access network 300. Each of the cells may measure a strength of the pilot signal, and the radio access network (e.g., one or more of the base stations 310 and 314/216 and/or a central node within the core network) may determine a serving cell for the UE 324. As the UE 324 moves through the radio access network 300, the network may continue to monitor the uplink pilot signal transmitted by the UE 324. When the signal strength or quality of the pilot signal measured by a neighboring cell exceeds that of the signal strength or quality measured by the serving cell, the network 300 may handover the UE 324 from the serving cell to the neighboring cell, with or without informing the UE 324.

Although the synchronization signal transmitted by the base stations 310, 312, and 314/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

The air interface in the radio access network 300 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 4:
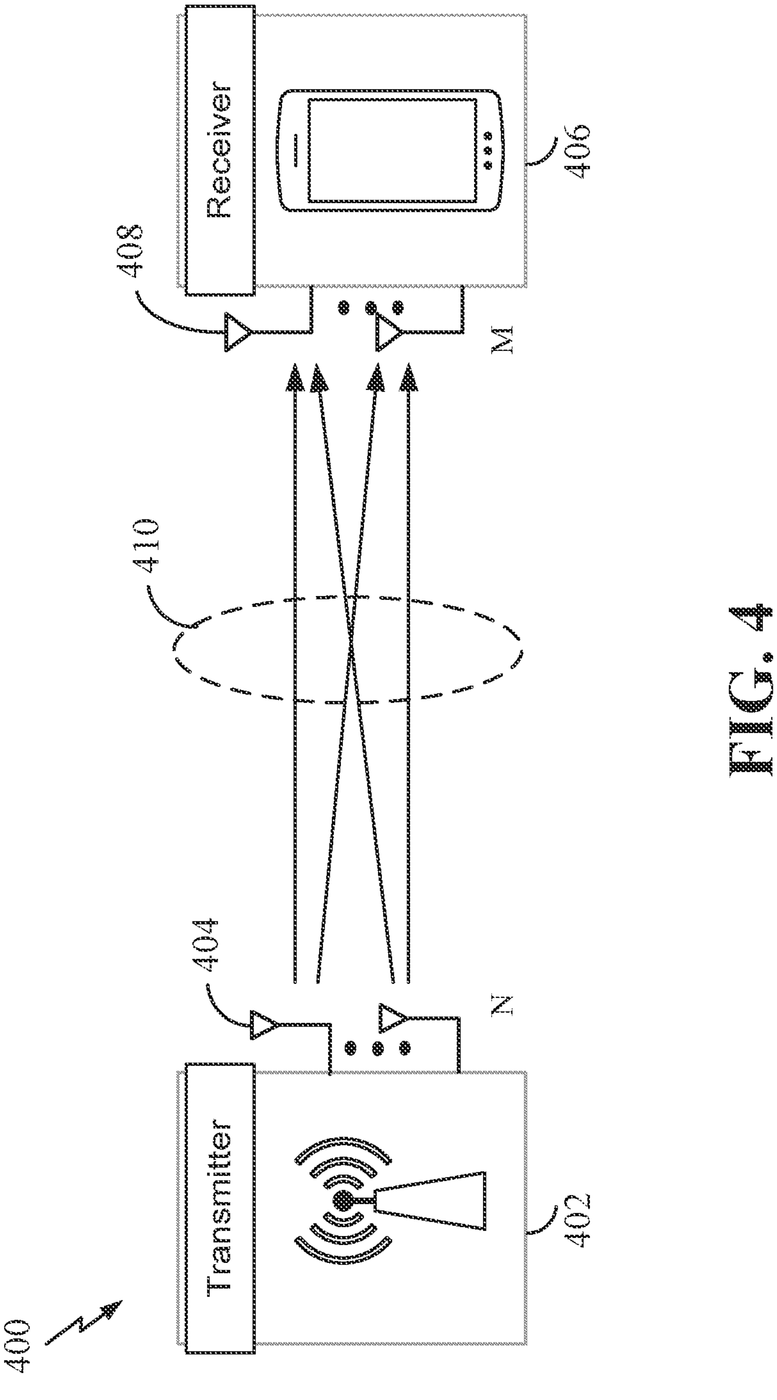
FIG. 4 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 4 illustrates an example of a wireless communication system 400 supporting MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

A UE may communicate with a service network using a subscription for a service (e.g., data service, voice service) provided by the service network. The UE may implement a subscription module such as a subscriber identification module (SIM) to connect to the service network. A UE may be configured to communicate using two or more subscriptions. For example, a UE implementing multiple SIMs respectively associated with multiple subscriptions may communicate using the multiple subscriptions via the multiple SIMs. The UE may establish communication links using the multiple subscriptions to perform communication using the multiple subscriptions. The communication links may be established with a common base station or with different base stations. For example, for a UE with two SIMs having a dual SIM, dual active (DSDA) capability, two SIMs may stay connected (or active) simultaneously with a network and thus may be used to perform communication simultaneously. In another example, for a UE with two SIMs having a dual SIM, dual standby (DSDS) capability, while one SIM is used to actively perform communication, the other SIM is placed on standby. The multiple SIMs may operate independently from one another. For example, each of the multiple SIMs may have its own connections for layer 1 (L1), layer 2 (L2), and layer 3 (L3) with a base station. Hence, the UE may treat the multiple communication links to be independent from one another.

When the multiple SIMs are implemented within the same UE, enhancements may be available to coordinate communications using the multiple communication links respectively associated with the multiple SIMs. For example, depending on a type of information to be communicated, optimal use of the communication links may differ. Therefore, optimizations may be made in utilizing multiple communication links originating from the same UE.

According to an aspect of the disclosure, for a UE configured to communicate using multiple subscriptions (e.g., via multiple SIMs), a base station and/or the UE may optimize coordination of the communication links respectively associated with the multiple subscriptions, when the communication links originate from the same UE. The coordination of the communication links may be performed based on information to be communicated between the base station and the UE. In an aspect, depending on a type of information to be communicated between the base station and the UE, more than one of the multiple communication links may be utilized to communicate the information or only one of the multiple communication links may be utilized to communicate the information. In an aspect, all of the communication links may be between the UE and the base station, or may be between the UE and multiple base stations.

Figure 5A:
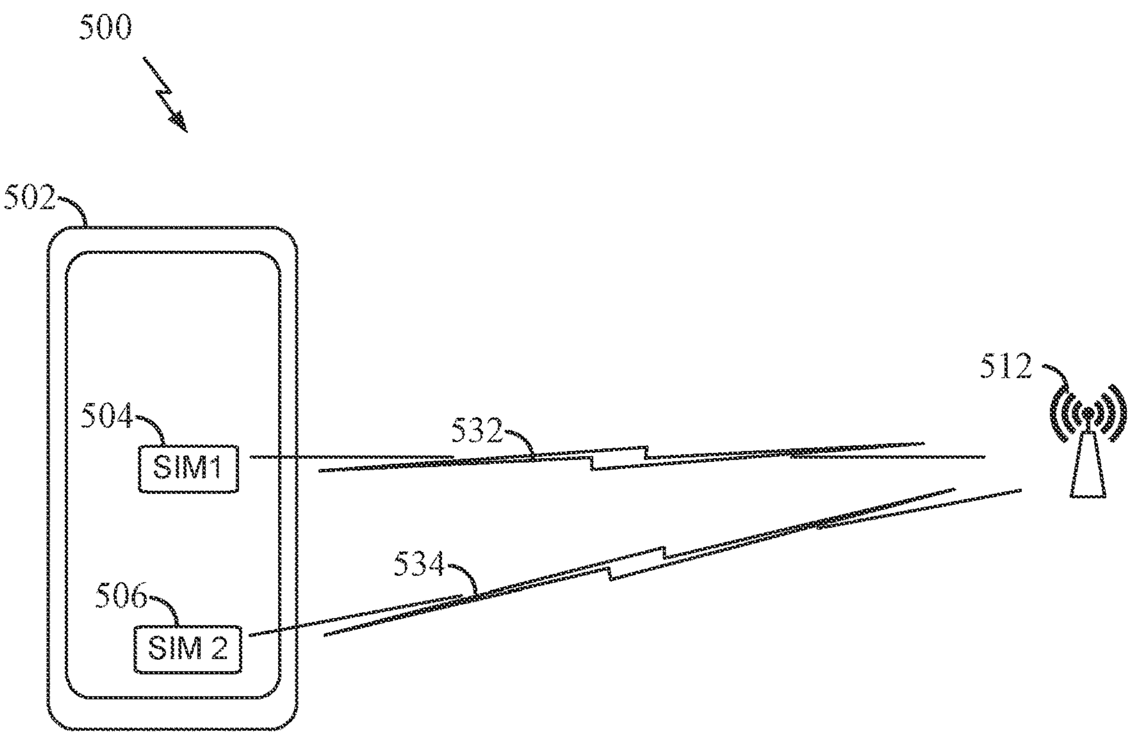
FIGS. 5A and 5B are example diagrams illustrating communication links respectively associated with multiple subscriptions of a UE, according to an aspect of the disclosure.
Figure 5B:
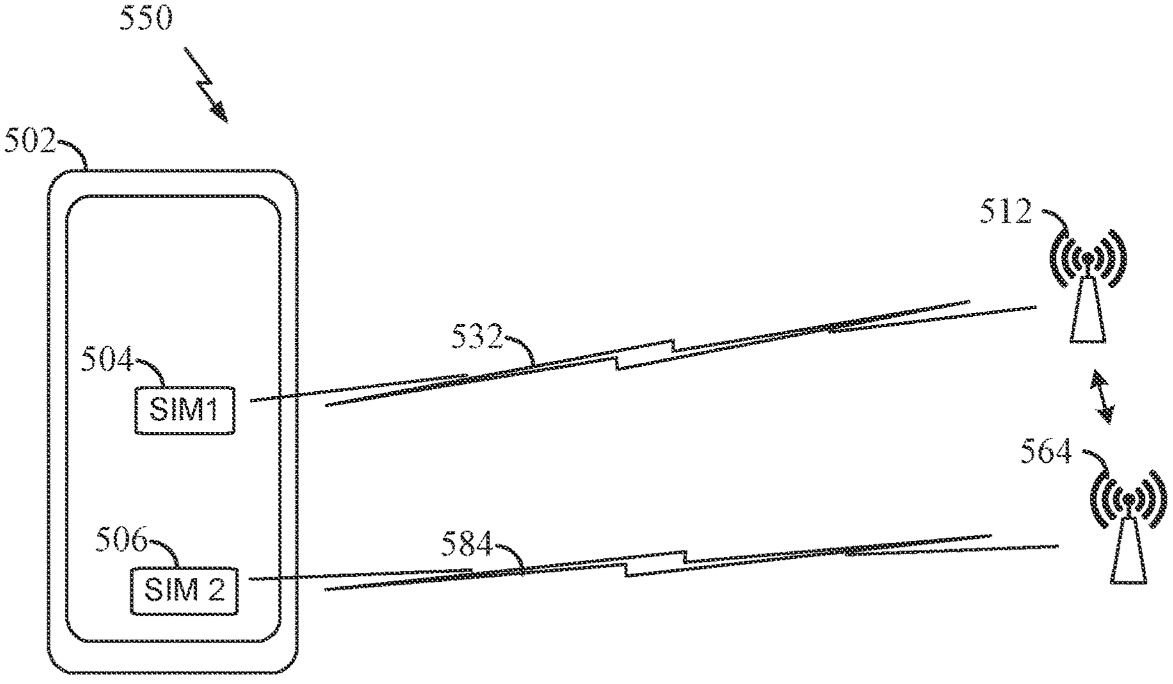

FIGS. 5A and 5B are example diagrams illustrating communication links respectively associated with multiple subscriptions of a UE, according to an aspect of the disclosure. In FIGS. 5A and 5B, a UE 502 includes two SIMs, a first SIM 504 associated with a first subscription and a second SIM 506 associated with a second subscription, where the UE 502 establishes two communication links using the two SIMs, respectively. FIG. 5A is an example diagram 500 illustrating multiple communication links established between a UE and a single base station. In FIG. 5A, the UE 502 utilizes the first SIM 504 to establish a connection via a first communication link 532 with a first base station 512 using the first subscription. Further, the UE 502 utilizes the second SIM 506 to establish a connection via a second communication link 534 with the first base station 512 using the second subscription. Therefore, in FIG. 5A, the first communication link 532 and the second communication link 534 are connected with the same base station, and the first base station 512 may coordinate use of the first communication link 532 and the second communication link 534. FIG. 5B is an example diagram 550 illustrating multiple communication links established between a UE and multiple base stations. The first communication link 532 in FIG. 5B may be the same as the first communication link 532 in FIG. 5A. Thus, in FIG. 5B, the UE 502 utilizes the first SIM 504 to establish a connection via the first communication link 532 with the first base station 512 using the first subscription. Unlike the example illustrated in FIG. 5A, in FIG. 5B, the UE 502 utilizes the second SIM 506 to establish a connection via a second communication link 584 with a second base station 564 using the second subscription. Therefore, in FIG. 5B, the first communication link 582 and the second communication link 584 are connected with different base stations. Therefore, in order to coordinate use of the first communication link 532 and the second communication link 534, the first base station 512 and the second base station 564 may communicate with each other.

Figure 6A:
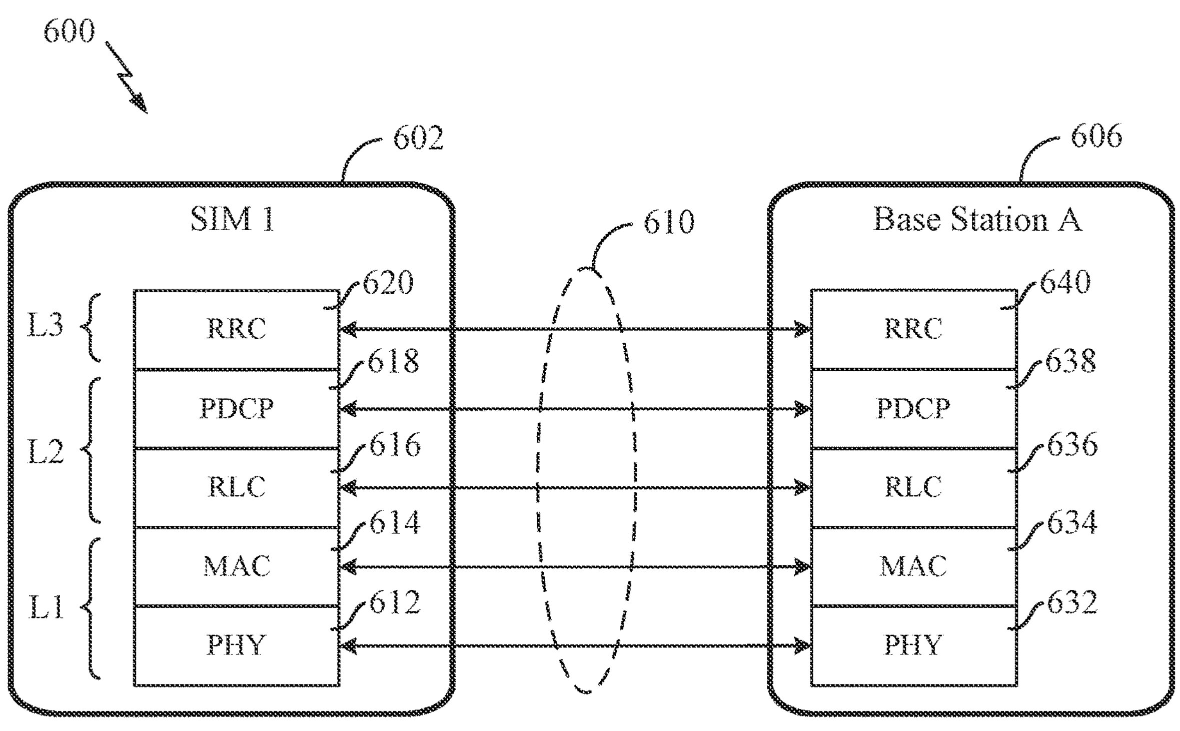
FIGS. 6A and 6B are example diagrams illustrating communication links between protocol stacks for two subscriptions in a UE and one or more base stations, according to an aspect of the disclosure.
Figure 6B:
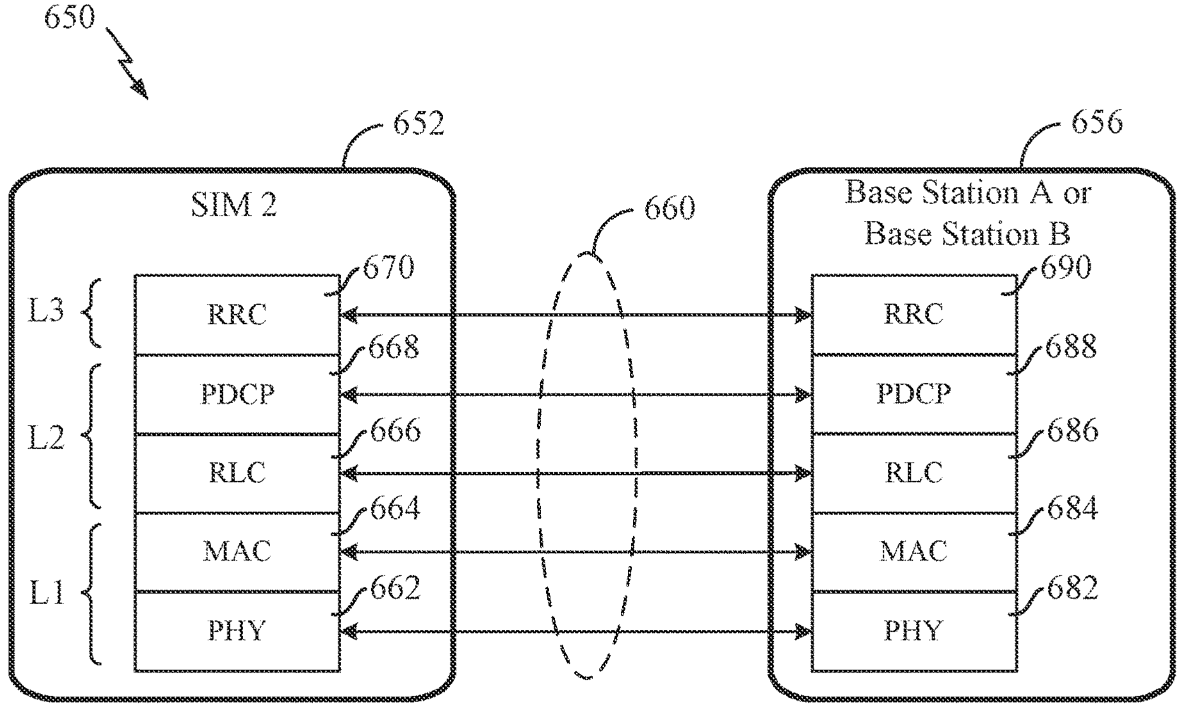

FIGS. 6A and 6B are example diagrams illustrating communication links between protocol stacks for two subscriptions in a UE and one or more base stations, where the UE is configured to communicate using the two subscriptions, according to an aspect of the disclosure. FIG. 6A is an example diagram 600 illustrating a first communication link between a protocol stack of a first SIM of the UE and a protocol stack of a base station. In FIG. 6A, a first SIM protocol stack 602 of a first SIM may include a physical (PHY) layer 612, a media access control (MAC) layer 614, a radio link control (RLC) layer 616, a packet data convergence protocol (PDCP) layer 618, and an RRC layer 620. The PHY layer 612 and the MAC layer 614 may be referred to as an L1 layer, the RLC layer 616 and the PDCP layer 618 may be referred to as an L2 layer, and the RRC layer 620 may be referred to as an L3 layer. The UE may use the first subscription of the first SIM to establish a first communication link 610 with a base station (e.g., base station A) that has a base station protocol stack 606. The base station protocol stack 606 of a base station A may include a PHY layer 632, a MAC layer 634, an RLC layer 636, a PDCP layer 638, and an RRC layer 640. The PHY layer 632 and the MAC layer 634 may be referred to as an L1 layer, the RLC layer 636 and the PDCP layer 638 may be referred to as an L2 layer, and the RRC layer 640 may be referred to as an L3 layer. As shown in FIG. 6A, each of the PHY layer 612, the MAC layer 614, the RLC layer 616, the PDCP layer 618, and the RRC layer 620 in the first SIM protocol stack 602 may separately communicate with a respective one of the PHY layer 632, the MAC layer 634, the RLC layer 636, the PDCP layer 638, and the RRC layer 640, via a first communication link 610.

FIG. 6B is an example diagram 650 illustrating a second communication link between a protocol stack of a second SIM of the UE and a protocol stack of a base station, which may be the same base station as the base station of FIG. 6A or a different base station. In FIG. 6B, a second SIM protocol stack 652 of a second SIM may include a PHY layer 662, a MAC layer 664, an RLC layer 666, a PDCP layer 668, and an RRC layer 670. The PHY layer 662 and the MAC layer 664 may be referred to as an L1 layer, the RLC layer 666 and the PDCP layer 668 may be referred to as an L2 layer, and the RRC layer 670 may be referred to as an L3 layer. The second SIM may establish a second communication link 660 with a base station that is the same base station as the base station (e.g., base station A) in FIG. 6A or a different base station (e.g., base station B), where the base station has a base station protocol stack 656. The base station protocol stack 656 of the base station A or the base station B may include a PHY layer 682, a MAC layer 684, an RLC layer 686, a PDCP layer 688, and an RRC layer 690. The PHY layer 682 and the MAC layer 684 may be referred to as an L1 layer, the RLC layer 686 and the PDCP layer 688 may be referred to as an L2 layer, and the RRC layer 690 may be referred to as an L3 layer. As shown in FIG. 6B, each of the PHY layer 662, the MAC layer 664, the RLC layer 666, the PDCP layer 668, and the RRC layer 670 in the second SIM protocol stack 652 may separately communicate with a respective one of the PHY layer 682, the MAC layer 684, the RLC layer 686, the PDCP layer 688, and the RRC layer 690, via a second communication link 660.

As discussed above, when the base station is aware that the multiple communication links associated with the multiple subscriptions originate from the same UE, the base station may determine to coordinate use of the multiple communication links to optimize the communications using the multiple communication links. The coordination of the multiple communication links associated with the multiple subscriptions may apply to a RAN, but may not apply to a core network. As such, for example, the core network may treat the multiple SIMs associated with the multiple subscriptions as separate devices, without being aware of the multiple SIMs residing in the same UE. Throughout the disclosure, a dual SIM UE with a first SIM (e.g., first SIM 504) and a second SIM (e.g., second SIM 506) respectively associated with a first subscription and a second subscription is used as an example, where the UE has established a first communication link (e.g., first communication link 532) using the first subscription of the first SIM and a second communication link (e.g., second communication link 534 or 584) using the second subscription of the second SIM. However, the disclosure is not limited to a case of a UE with two SIMs and may be applied to a case of a UE with three or more SIMs.

In an aspect, to enable the base station to determine whether the communication links originate from the same UE, the UE may transmit UE identification information associated with different communication links/subscriptions to base station(s) using one of the communication links. If the base station determines that multiple UE identification information associated with different communication links are received, then the base station may determine that these communication links are received from the same UE. For example, if a base station receives both first UE identification information associated with a first communication link/first subscription and second UE identification information associated with a second communication link/second subscription via one of the first and second communication links, the base station may determine that these two communication links originate from the same UE. In another aspect, each UE identification information associated with a respective communication link may be transmitted via the respective communication link, and/or via another communication link. Hence, for example, the UE may transmit the UE identification information associated with the first communication link via the first communication link using the first subscription and the UE identification information associated with the second communication link via the second communication link using the second subscription. In another example, the UE may utilize the first communication link using the first subscription to transmit both the UE identification information associated with the first communication link and the UE identification information associated with the second communication link.

Subsequently, the base station may determine that the first and second communication links originate from the same UE if the UE identification information associated with the first communication link matches the UE identification information associated with the second communication link. If the second communication link is used to transmit the UE identification information associated with the second communication link and the second communication link is with a different base station, the different base station may communicate the UE identification information associated with the second communication link to the base station, such that the base station may compare the UE identification information associated with the first communication link and the UE identification information associated with the second communication link.

In an aspect, the UE identification information may be transmitted to the base station using radio resource control (RRC) signaling. For example, when the UE initiates an RRC process such as an RRC connection setup, an RRC connection resume process, and an RRC connection re-establishment process, the UE may transmit, using the first communication link, a report to the base station including an RRC status and the UE identification information associated with the second communication link. As such, the base station may be aware of the second communication link, even if the second communication link may be idle and/or may be with another base station. In an aspect, the UE identification information may be a cell radio network temporary identifier (RNTI), such as a cell radio network temporary identifier (C-RNTI) or an inactive radio network temporary identifier (I-RNTI). In an aspect, if the multiple communication links from the UE are connected to different base stations, the UE may also transmit cell IDs associated with the different base stations. For example, if the first communication link is connected to a first base station and the second communication link is connected to a second base station, the UE may transmit a cell ID of the second base station to the first base station via the first communication link.

In an aspect, the UE identification information may be a serving temporary mobile subscriber identity (S-TMSI). In some cases, one communication link may be active (e.g., in a connected mode) while another communication link may be idle. If the first communication link is active and the second communication link is idle, the UE may report an S-TMSI associated with the second subscription to the base station using the first communication (e.g., as long as there is no security issue). For example, if communication links using two subscriptions are in an idle mode and one of the communication links becomes connected, then the UE may report an S-TMSI associated with the second subscription via a first communication link to indicate to the base station that there is a second subscription. Subsequently, the base station may attempt to establish an active communication link with the UE using the second subscription. In this scenario, when the UE attempts to establish a communication link with the base station using the second subscription, the UE may not need for report the S-TMSI associated with the second subscription.

In an aspect, the UE may transmit UE RAN (e.g., baseband, RF) capability information to the base station(s) using one or more of the communication links. For example, the UE RAN capability information may include one or more of a MAC capability, a number of MIMO layers that can be supported, frequency bands that can be supported, and a carrier aggregation capability. For example, the UE may transmit the UE RAN capability information using both the first communication link and the second communication link. In another example, the UE may transmit the UE RAN capability information using only the first communication link. In this example, the base station that receives the UE RAN capability information via the first communication link may assume that the UE RAN capability information is shared among the first and the second communication links using the first and second subscriptions, respectively.

As the base station is aware of the multiple communication links belonging to the same UE, the base station may coordinate use of the multiple communication links to optimize communication, depending on the information to be communicated. For example, this may be advantageous in that the coordination of the multiple communication links may be easily implemented, especially at the base station, with no or minor modifications in the UE. The information to be communicated may include information related to scheduling for data communication, mobility decisions, status monitoring, etc.

In an aspect, if the information to be communicated is a radio link monitoring (RLM) signal, the base station may transmit the RLM signal via one of the communication links, and may not transmit the RLM signal via the other communication links. Especially in a case where the communication links are connected to the same primary cell (PCell) or different PCells that are correlated (e.g., operating at similar or same frequency bands), it may not be necessary to transmit the RLM signal via all of the communication links. This optimization may be made because the RLM signal may be the same or similar for different communication links of the communication links are connected to the same PCell (e.g., or same base station) or different PCells (e.g., different base stations) that are correlated, especially when the communication links are connected to the same UE. Thus, for example, the base station may transmit the RLM signal to the UE via the first communication link using the first subscription, without using the second communication link to transmit the RLM signal.

In an aspect, as discussed above, the communication links may be established with the same PCell (e.g., same base station) or may be established with different PCells (e.g., different base stations). For example, the first communication link may be established with a first base station associated with a first PCell and the second communication link may be established with a second base station associated with a second PCell. The first and second PCells may be correlated. In another aspect, the communication links may be established with different distribution units of the same base station. For example, the first communication link may be established with a first distribution unit of a base station and the second communication link may be established with a second distribution unit of the base station.

In an aspect, if the information to be communicated is radio resource management (RRM) information, the base station may transmit the RRM information via one of the communication links, and may not transmit the RRM information via other communication links. For example, when the communication links are connected to the same UE, RRM measurements made on one communication link may be used for another communication link. Because the RRM measurements are not made on all of the communication links but on one of the communication links, power consumption due to the RRM measurements may be reduced.

In an aspect, with regard to the UE mobility, handover commands for the multiple subscriptions may be transmitted to the UE substantially simultaneously via respective communication links. For example, a first handover command for a first subscription may be transmitted to the UE via the first communication link to trigger a first handover for the first subscription to a target base station, and a second handover command for the second subscription may be transmitted to the UE via the second communication link to trigger a second handover for the second subscription to the target base station. The first handover command and the second handover command may be transmitted to the UE substantially simultaneously. As such, for each communication link, a handover to the target station may be performed around the same time. The handover commands may be different for different communication links. In an aspect, the measurements to determine whether to handover to a target station may be performed (e.g., by the UE and/or the base station) on one or more of the communication links. In an example, the measurements to determine whether to handover to the target base station may be performed on one of the communication links, especially when the communication links are connected to the same UE. In an aspect, the handover command may be for a conditional handover, where a handover occurs when a certain condition is satisfied. In an aspect, at least one of the first handover or the second handover may be a dual active protocol stack (DAPS) handover. For example, a first handover for one communication link may be a DAPS handover and a second handover for another communication link may be a legacy handover.

In an aspect, if secondary cells (SCells) are used, different SCells are used for different communication links. The UE may be connected to one or more PCells and one or more SCells (e.g., for carrier aggregation). For example, if multiple communication links are connected to the same SCell, collision in communication may occur. Thus, for example, to avoid the collision, different communication links from the UE may be used to connect to different SCells. As discussed above, for example, the first and second communication links from the UE may be connected to the PCell of the same base station or may be connected to two different PCells that are correlated, while different communication links are established with different SCells.

In an aspect, the base station may schedule to perform data communication using the multiple communication links at different times at a full capacity, or may schedule data communication using the multiple communication links to be performed simultaneously at a reduced capacity. In some cases, for example, if the UE is scheduled to perform data communication on the first and second communication links simultaneously, data collision may occur. For example, when first data is to be communicated via the first communication link and second data is to be communicated via the second communication link, the base station may schedule the UE to communicate the first data via the first communication link during a first time period, and may schedule the UE to communicate the second data via the second communication link during a second time period different from the first time period, so as to avoid data collision between the first and second communication links. For example, the scheduled communication may be an uplink communication or a downlink communication by the UE, which may be scheduled via a physical downlink control channel (PDCCH) transmitted to the UE.

In an aspect, configured grants (CGs) may be transmitted to the UE using different communication links at different times, for communication at full capability. Further, in an aspect, a semi-persistent scheduling (SPS) configuration may be transmitted to the UE using different communication links at different times, for communication at full capability. Using different communication links at different times to transmit the CGs and/or the SPS may help the UE use full capability for communication of the CGs and/or the SPS. In another aspect, the CGs and/or the SPS configuration may be transmitted to the UE substantially simultaneously using different communication links, but the transmission may be performed at reduced capability.

In an aspect, physical uplink control channel (PUCCH) information may be transmitted to the UE using different communication links at different times, e.g., via time-division multiplexing (TDM). In an aspect, a sounding reference signal (SRS) configuration may be transmitted to the UE using different communication links at different times, e.g., via TDM. In an aspect, if a PCell and an SCell are correlated, an SRS configuration may be transmitted using a single communication link.

In an aspect, if a same PCell is used for the communication links or if different PCells respectively associated with the communication links are in the same frequency band (and thus are likely correlated). RLM monitoring and/or beam monitoring may be performed using one of the communication links. In an example, the UE may receive an RLM signal via one of the communication links, and monitor a condition of the one of the communication links based on the RLM signal. In an example, the UE may receive reference signals associated with beams of a base station via one of the communication links, and may monitor the conditions of the beams of the base station based on the reference signals.

In an aspect, the base station may transmit system information (SI) associated with the base station to the UE using one of the multiple communication links. The base station and/or the UE may monitor a change in the SI on the one of the communication links. For example, if the communication links are connected to a common PCell or common SCell, the SI changes (e.g., changes in a system information block) may be monitored on one of the communication links. Any change in the SI may be applied to a Cell or a SCell common to the communication links.

In an aspect, a public warning system (PWS) message and/or an in-device coexistence (IDC) indication may be transmitted to the UE using one of the multiple communication links. In an aspect, the UE may monitor for the PWS message on one of the communication links, regardless of whether the communication links are connected to the same base station or two different base stations in the same area. Generally, a same PWS message is sent by base stations in the same area, and thus it may not be necessary to monitor for the PWS message on all of the communication links.

In an aspect, the UE may transmit a UE assistance information (UAI) using one of the multiple communication links. For example, the UAI may be transmitted on one of the communication links in certain cases where the UE experiences problems (e.g., the UE overheating). For example, when only one of the first and second communication links is used to transmit the UAI, the base station may be aware that the UAI is associated with both the first communication link and the second communication link.

Figure 7:
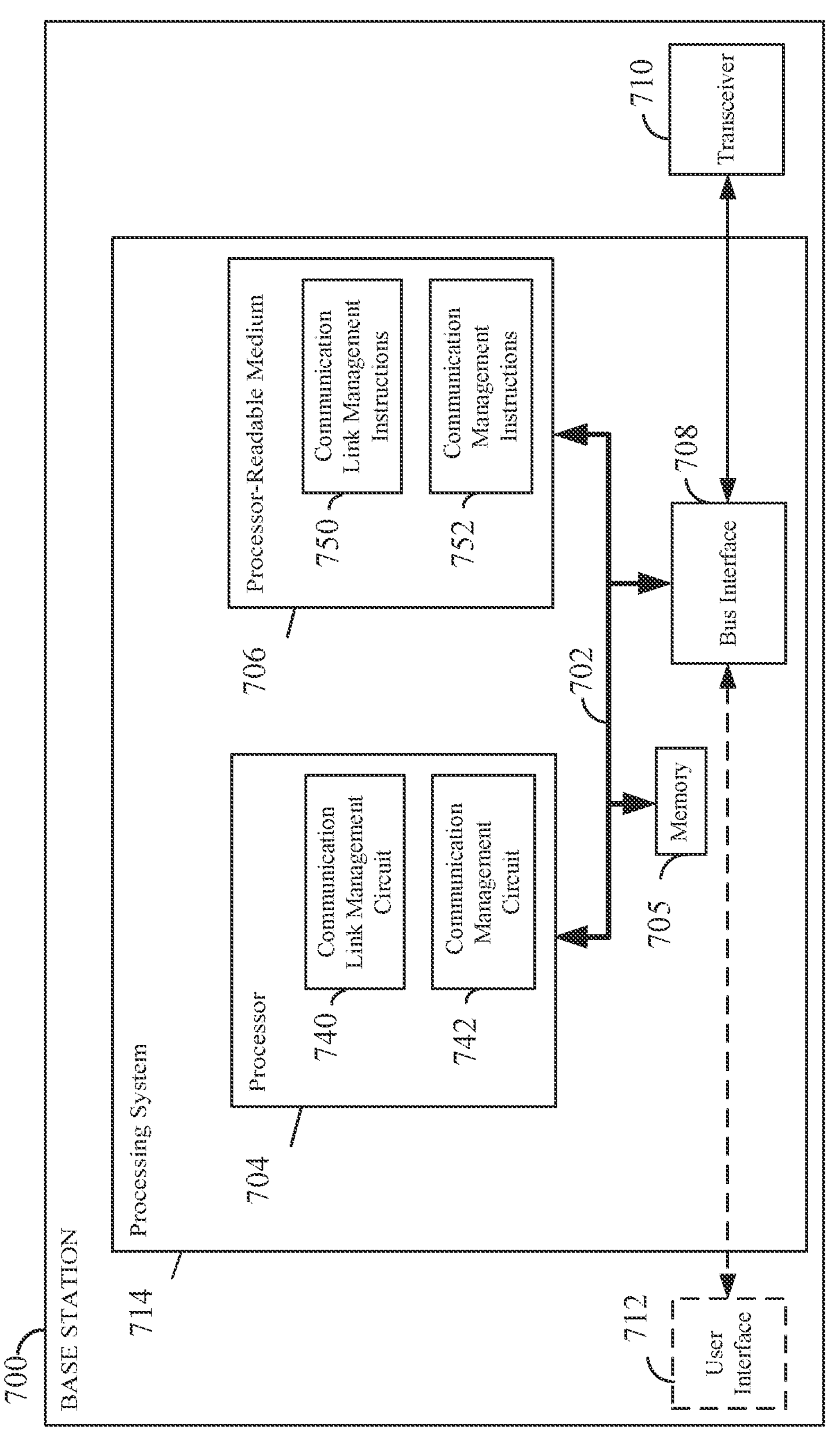
FIG. 7 is a block diagram conceptually illustrating an example of a hardware implementation for a base station according to some aspects of the disclosure.

FIG. 7 is a block diagram illustrating an example of a hardware implementation for a base station 700 employing a processing system 714. For example, the base station 700 may be a base station as illustrated in any one or more of FIGS. 1, 2, 3, and/or 5.

The base station 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 700 may be configured to perform any one or more of the functions described herein. That is, the processor 704, as utilized in a base station 700, may be used to implement any one or more of the processes and procedures described below and illustrated in FIG. 8.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and processor-readable storage media (represented generally by the processor-readable storage medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a transmission medium. Depending upon the nature of the apparatus, a user interface 712 (e.g., keypad, display, speaker, microphone, joystick) may also be provided. Of course, such a user interface 712 is optional, and may be omitted in some examples, such as a base station.

In some aspects of the disclosure, the processor 704 may include communication link management circuitry 740 configured for various functions, including, for example, determining that a first communication link and a second communication link are established with a UE using a first subscription and a second subscription of the UE, respectively, wherein at least one of the first communication link or the second communication link is established between the UE and the base station. For example, the communication link management circuitry 740 may be configured to implement one or more of the functions described below in relation to FIG. 8, including, e.g., block 802.

In some aspects of the disclosure, the processor 704 may include communication management circuitry 742 configured for various functions, including, for example, coordinating communication of information with the UE via at least one of the first communication link or the second communication link based on the determination, wherein coordinating the communication of information comprises selecting, based on the information, one of (a) the first communication link and the second communication link for communicating the information, or (b) the first communication link or the second communication link for communicating the information without utilizing the other communication link. For example, the communication management circuitry 742 may be configured to implement one or more of the functions described below in relation to FIG. 8, including, e.g., block 804.

In some aspects of the disclosure, the communication management circuitry 742 may be configured for various functions, including, for example, communicating the information with the UE via the selected first communication link and/or second communication link. For example, the communication management circuitry 742 may be configured to implement one or more of the functions described below in relation to FIG. 8, including, e.g., block 806.

The processor 704 is responsible for managing the bus 702 and general processing, including the execution of software stored on the processor-readable storage medium 706. The software, when executed by the processor 704, causes the processing system 714 to perform the various functions described below for any particular apparatus. The processor-readable storage medium 706 and the memory 705 may also be used for storing data that is manipulated by the processor 704 when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium 706. The processor-readable storage medium 706 may be a non-transitory processor-readable storage medium. A non-transitory processor-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The processor-readable storage medium 706 may reside in the processing system 714, external to the processing system 714, or distributed across multiple entities including the processing system 714. The processor-readable storage medium 706 may be embodied in a computer program product. By way of example, a computer program product may include a processor-readable storage medium in packaging materials. Those skilled in the art will recognize how best to implement the described functionality presented throughout this disclosure depending on the particular application and the overall design constraints imposed on the overall system.

In some aspects of the disclosure, the processor-readable storage medium 706 may include communication link management software/instructions 750 configured for various functions, including, for example, determining that a first communication link and a second communication link are established with a UE using a first subscription and a second subscription of the UE, respectively, wherein at least one of the first communication link or the second communication link is established between the UE and the base station. For example, the communication link management software/instructions 750 may be configured to implement one or more of the functions described below in relation to FIG. 8, including, e.g., block 802.

In some aspects of the disclosure, the processor-readable storage medium 706 may include communication management software/instructions 752 configured for various functions, including, for example, coordinating communication of information with the UE via at least one of the first communication link or the second communication link based on the determination, wherein coordinating the communication of information comprises selecting, based on the information, one of (a) the first communication link and the second communication link for communicating the information, or (b) the first communication link or the second communication link for communicating the information without utilizing the other communication link. For example, the communication management software/instructions 752 may be configured to implement one or more of the functions described below in relation to FIG. 8, including, e.g., block 804.

In some aspects of the disclosure, the communication management software/instructions 752 may be configured for various functions, including, for example, communicating the information with the UE via the selected first communication link and/or second communication link. For example, the communication management software/instructions 752 may be configured to implement one or more of the functions described below in relation to FIG. 8, including, e.g., block 806.

Figure 8:
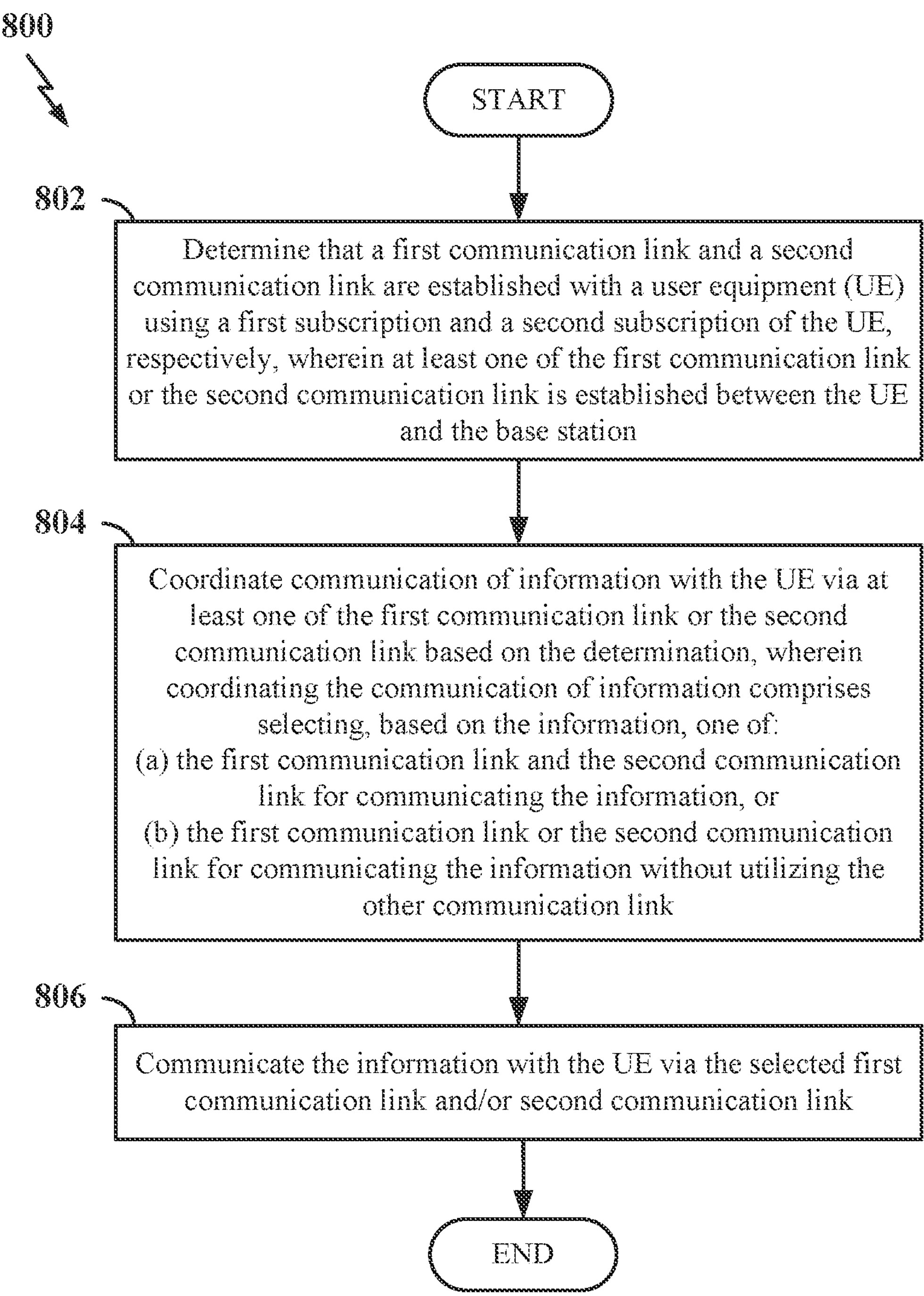
FIG. 8 is a flow chart illustrating an exemplary process for wireless communication by a base station, according to some aspects of the disclosure.

FIG. 8 is a flow chart illustrating an exemplary process 800 for wireless communication by a base station, in accordance with some aspects of the present disclosure. As described below, some or all illustrated features may be omitted in a particular implementation within the scope of the present disclosure, and some illustrated features may not be required for implementation of all embodiments. In some examples, the process 800 may be carried out by the base station 700 illustrated in FIG. 7. In some examples, the process 800 may be carried out by any suitable apparatus or means for carrying out the functions or algorithm described below.

At block 802, the process 800 includes determining that a first communication link and a second communication link are established with a user equipment (UE) using a first subscription and a second subscription of the UE, respectively, wherein at least one of the first communication link or the second communication link is established between the UE and the base station. In an aspect, the first communication link may be established between the UE and the base station and the second communication link may be established between the UE and one of the base station and a second base station. In an aspect, the base station may be associated with a first PCell and the second base station may be associated with a second PCell. In an aspect, the first communication link may be established between the UE and a first distribution unit of the base station, and the second communication link may be established between the UE and one of the first distribution unit and a second distribution unit of the base station. In an aspect, the first communication link may be established using a first protocol stack of the base station, the first protocol stack including a first layer 1, a first layer 2, and a first layer 3, and the second communication link may be established using a second protocol stack of the base station that is different from the first protocol stack, the second protocol stack including a second layer 1, a second layer 2, and a second layer 3.

In an aspect, the determining at block 802 that the first communication link and the second communication link are established with the UE may include: receiving first UE identification information associated with the first communication link and second UE identification information associated with the second communication link via one of the first communication link and the second communication link, and determining that the first and second communication links are associated with the UE in response to determining that the first UE identification information and the second UE identification information are received via the one of the first communication link and the second communication link. In an aspect, the first UE identification information includes at least one of a first RNTI or a first S-TMSI associated with the first subscription and the second UE identification information includes at least one of a second RNTI or a second S-TMSI associated with the second subscription. In an aspect, the first RNTI may be a first C-RNTI and the second RNTI is a second C-RNTI.

In an aspect, the first communication link may be connected to a first SCell using the first subscription, and the second communication link may be connected to a second SCell different from the first SCell using the second subscription.

At block 804, the process 800 includes coordinating communication of information with the UE via at least one of the first communication link or the second communication link based on the determination, wherein coordinating the communication of information comprises selecting, based on the information, one of: (a) the first communication link and the second communication link for communicating the information, or (b) the first communication link or the second communication link for communicating the information without utilizing the other communication link.

In an aspect, the information may include first data to be scheduled for the first communication link and second data to be scheduled for the second communication link. In this aspect, the coordinating at block 804 may include: scheduling the UE to communicate the first data via the first communication link during a first time period, and scheduling the UE to communicate the second data via the second communication link during a second time period different from the first time period.

At block 806, the process 800 includes communicating the information to the UE via the selected first communication link and/or second communication link.

In an aspect, the information may include at least one of an RLM signal or RRM information used for the first subscription and the second subscription. In this aspect, the communicating the information at block 806 may include transmitting at least one of the RLM signal or the RRM information to the UE via the one of the first communication link and the second communication link.

In an aspect, the information may include a first handover command and a second handover command, the first handover command requesting the UE to perform a first handover from the base station to a target base station using the first subscription, and the second handover command requesting the UE to perform a second handover from the base station to the target base station using the second subscription. In this aspect, the communicating the information at block 804 may include: transmitting the first handover command to the UE via the first communication link using the first subscription during a first time period, and transmitting the second handover command to the UE via the second communication link using the second subscription during a second time period which substantially overlaps with the first time period. In an aspect, at least one of the first handover or the second handover may be a dual active protocol stack (DAPS) handover. In an aspect, the first handover command and the second handover command may be for a conditional handover to the target base station.

In an aspect, the information may include at least one of a first CG or a first SPS configuration associated with the first subscription and at least one of a second CG or a second SPS configuration associated with the second subscription. In this aspect, the communicating the information at block 804 may include: transmitting the at least one of the first CG or the first SPS configuration to the UE via the first communication link using the first subscription during a first time period, and transmitting the at least one of the second CG or the SPS configuration to the UE via the second communication link using the second subscription during a second time period different from the first time period.

In an aspect, the information may include at least one of a first physical uplink control channel (PUCCH) information or a first sounding reference signal (SRS) configuration associated with the first subscription and at least one of a second PUCCH information or a second SRS configuration associated with the second subscription. In this aspect, the communicating the information at block 804 may include: transmitting the at least one of the first PUCCH or the first SRS configuration to the UE via the first communication link using the first subscription based on time division multiplexing, and transmitting the at least one of the second PUCCH or the second SRS configuration to the UE via the second communication link using the second subscription based on the time division multiplexing.

In an aspect, the information may include a sounding reference signal (SRS) configuration associated with the first subscription and the second subscription. In this aspect, the communicating the information at block 804 may include transmitting the SRS configuration to the UE via the one of the first communication link and the second communication link.

In an aspect, the information may include system information associated with the base station. In this aspect, the communicating the information at block 804 may include transmitting the system information via the one of the first communication link and the second communication link.

In an aspect, the information may include at least one of a public warning system (PWS) message or an in-device coexistence (IDC) indication associated with the first subscription and the second subscription. In this aspect, the communicating the information at block 804 may include transmitting the at least one of the PWS message or the IDC indication to the UE via one of the first communication link and the second communication link.

In one configuration, the base station 700 includes means for determining that a first communication link and a second communication link are established with a UE using a first subscription and a second subscription of the UE, respectively, wherein at least one of the first communication link or the second communication link is established between the UE and the base station, means for coordinating communication of information with the UE via at least one of the first communication link or the second communication link based on the determination, wherein coordinating the communication of information comprises selecting, based on the information, one of (a) the first communication link and the second communication link for communicating the information, or (b) the first communication link or the second communication link for communicating the information without utilizing the other communication link, and means for transmitting the information to the UE via the selected first communication link and/or second communication link. In one aspect, the aforementioned means may be the processor(s) 704 shown in FIG. 7 configured to perform the functions recited by the aforementioned means. In another aspect, the aforementioned means may be a circuit or any apparatus configured to perform the functions recited by the aforementioned means.

Of course, in the above examples, the circuitry included in the processor 704 is merely provided as an example, and other means for carrying out the described functions may be included within various aspects of the present disclosure, including but not limited to the instructions stored in the processor-readable storage medium 706, or any other suitable apparatus or means described in any one of the FIGS. 1, 2, 3, and 5, and utilizing, for example, the processes and/or algorithms described herein in relation to FIG. 8.

Figure 9:
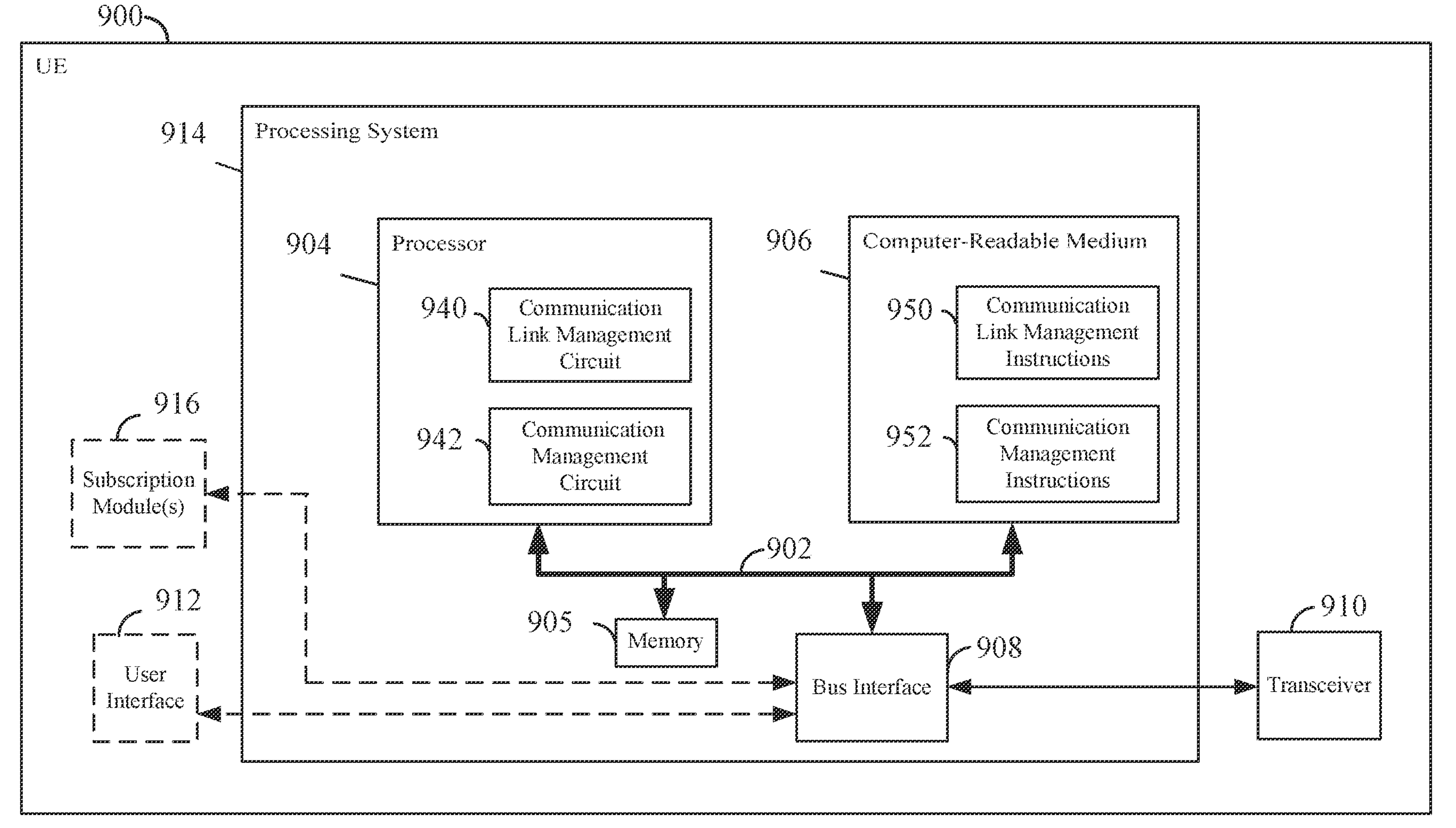
FIG. 9 is a block diagram conceptually illustrating an example of a hardware implementation for a user equipment according to some aspects of the disclosure.

FIG. 9 is a block diagram illustrating an example of a hardware implementation for a UE 900 employing a processing system 914. For example, the UE 900 may be a UE as illustrated in any one or more of FIGS. 1, 2, 3, and/or 5.

The UE 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 900 may be configured to perform any one or more of the functions described herein. That is, the processor 904, as utilized in a UE 900, may be used to implement any one or more of the processes and procedures described below and illustrated in FIG. 10.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and processor-readable storage media (represented generally by the processor-readable storage medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a communication interface or means for communicating with various other apparatus over a transmission medium. In an aspect, the UE 900 may include a subscription module 916 that may be used to register with a service network. In such an aspect, the bus interface 908 may provide an interface between the bus 902, the transceiver 910, and the subscription module 916. In an aspect, the subscription module 916 may enable the UE 900 to use multiple subscriptions, such as a first subscription and a second subscription, to provide a service. The subscription module 916 may include multiple subscription modules respectively for the multiple subscriptions. Depending upon the nature of the apparatus, a user interface 912 (e.g., keypad, display, speaker, microphone, joystick) may also be provided. Of course, such a user interface 912 is optional, and may be omitted in some examples, such as a base station.

In some aspects of the disclosure, the processor 904 may include communication link management circuitry 940 configured for various functions, including, for example, establishing a first communication link with a base station using a first subscription. For example, the communication link management circuitry 940 may be configured to implement one or more of the functions described below in relation to FIG. 10, including, e.g., block 1002.

In some aspects of the disclosure, the communication link management circuitry 940 may be configured for various functions, including, for example, establishing a second communication link with one of the base station or a second base station using a second subscription. For example, the communication link management circuitry 940 may be configured to implement one or more of the functions described below in relation to FIG. 10, including, e.g., block 1004.

In some aspects of the disclosure, the processor 904 may include communication management circuitry 942 configured for various functions, including, for example, coordinating communication of information via at least one of the first communication link or the second communication link, wherein the coordinating the communication comprises selecting, based on the information, one of (a) the first communication link and the second communication link for communicating the information, or (b) the first communication link or the second communication link for communicating the information without utilizing the other communication link. For example, the communication management circuitry 942 may be configured to implement one or more of the functions described below in relation to FIG. 10, including, e.g., block 1008.

In some aspects of the disclosure, the communication management circuitry 942 may be configured for various functions, including, for example, communicating the information via at least one of the first communication or the second communication based on the coordinating. For example, the communication management circuitry 942 may be configured to implement one or more of the functions described below in relation to FIG. 10, including, e.g., block 1010.

In some aspects of the disclosure, the communication management circuitry 942 may be configured for various functions, including, for example, transmitting first UE identification information associated with the first communication link and second UE identification information associated with the second communication link via one of the first communication link and the second communication link. For example, the communication management circuitry 942 may be configured to implement one or more of the functions described below in relation to FIG. 10, including, e.g., block 1006.

The processor 904 is responsible for managing the bus 902 and general processing, including the execution of software stored on the processor-readable storage medium 906. The software, when executed by the processor 904, causes the processing system 914 to perform the various functions described below for any particular apparatus. The processor-readable storage medium 906 and the memory 905 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium 906. The processor-readable storage medium 906 may be a non-transitory processor-readable storage medium. A non-transitory processor-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The processor-readable storage medium 906 may reside in the processing system 914, external to the processing system 914, or distributed across multiple entities including the processing system 914. The processor-readable storage medium 906 may be embodied in a computer program product. By way of example, a computer program product may include a processor-readable storage medium in packaging materials. Those skilled in the art will recognize how best to implement the described functionality presented throughout this disclosure depending on the particular application and the overall design constraints imposed on the overall system.

In some aspects of the disclosure, the processor-readable storage medium 906 include communication link management software/instructions 950 configured for various functions, including, for example, establishing a first communication link with a base station using a first subscription. For example, the communication link management software/instructions 950 may be configured to implement one or more of the functions described below in relation to FIG. 10, including, e.g., block 1002.

In some aspects of the disclosure, the communication link management software/instructions 950 may be configured for various functions, including, for example, establishing a second communication link with one of the base station or a second base station using a second subscription. For example, the communication link management software/instructions 950 may be configured to implement one or more of the functions described below in relation to FIG. 10, including. e.g., block 1004.

In some aspects of the disclosure, the processor-readable storage medium 906 may include communication management software/instructions 952 configured for various functions, including, for example, coordinating communication of information via at least one of the first communication link or the second communication link, wherein the coordinating the communication comprises selecting, based on the information, one of (a) the first communication link and the second communication link for communicating the information, or (b) the first communication link or the second communication link for communicating the information without utilizing the other communication link. For example, the communication management software/instructions 952 may be configured to implement one or more of the functions described below in relation to FIG. 10, including, e.g., block 1008.

In some aspects of the disclosure, the communication management software/instructions 952 may be configured for various functions, including, for example, communicating the information via at least one of the first communication or the second communication based on the coordinating. For example, the communication management software/instructions 952 may be configured to implement one or more of the functions described below in relation to FIG. 10, including, e.g., block 1010.

In some aspects of the disclosure, the communication management software/instructions 952 may be configured for various functions, including, for example, transmitting first UE identification information associated with the first communication link and second UE identification information associated with the second communication link via one of the first communication link and the second communication link. For example, the communication management software/instructions 952 may be configured to implement one or more of the functions described below in relation to FIG. 10, including, e.g., block 1006.

FIG. 10 is a flow chart illustrating an exemplary process 1000 for wireless communication by a UE, in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the UE 900 illustrated in FIG. 9. In some examples, the process 1000 may be carried out by any suitable apparatus or means for carrying out the functions or algorithm described below.

At block 1002, the process 1000 includes establishing a first communication link with a base station using a first subscription.

At block 1004, the process 1000 includes establishing a second communication link with one of the base station or a second base station using a second subscription. In an aspect, the base station may be associated with a first primary cell (PCel) and the second base station may be associated with a second PCell. In an aspect, the first communication link may be established between the UE and a first distribution unit of the base station, and the second communication link may be established between the UE and one of the first distribution unit and a second distribution unit of the base station. In an aspect, the first communication link may be established using a first protocol stack of the UE, the first protocol stack including a first layer 1, a first layer 2, and a first layer 3, and the second communication link may be established using a second protocol stack of the UE that is different from the first protocol stack, the second protocol stack including a second layer 1, a second layer 2, and a second layer 3.

At block 1006, the process 1000 may include transmitting first UE identification information associated with the first communication link and second UE identification information associated with the second communication link via one of the first communication link and the second communication link. In an aspect, the first UE identification information may include at least one of a first RNTI or a first S-TMSI associated with the first subscription and the second UE identification information includes at least one of a second RNTI or a second S-TMSI associated with the second subscription. In an aspect, the first RNTI may be a first C-RNTI and the second RNTI is a second C-RNTI.

At block 1008, the process 1000 includes coordinating communication of information via at least one of the first communication link or the second communication link, wherein the coordinating the communication comprises selecting, based on the information, one of (a) the first communication link and the second communication link for communicating the information, or (b) the first communication link or the second communication link for communicating the information without utilizing the other communication link.

In an aspect, the coordinating the communication at block 1008 may be in response to transmitting the first UE identification information and the second UE identification information via the one of the first communication link and the second communication link at block 1006.

At block 1010, the process 1000 includes communicating the information via at least one of the first communication or the second communication based on the coordinating.

In an aspect, the information may include a cell identification information associated with the second base station. In this aspect, the communicating the information at block 1010 may include transmitting the cell identification information to the base station via the one of the first communication link and the second communication link.

In an aspect, the information may include an RRC status report associated with at least one of the first communication link or the second communication link. In this aspect, the communicating the information at block 1010 may include transmitting the RRC status report via one of the first communication link and the second communication link.

In an aspect, the information may include UE RAN capability information associated with the UE. In this aspect, the communicating the information at block 1010 may include transmitting the UE RAN capability information via the one of the first communication link and the second communication link.

In an aspect, the information may include at least one of RLM signal for monitoring a link quality or one or more reference signals associated with one or more beams. In this aspect, the communicating the information at block 1010 may include receiving the at least one of the RLM signal or the one or more reference signals via the one of the first communication link and the second communication link. In this aspect, the communicating the information at block 1010 may further include performing at least one of: monitoring a condition of at least one of the first communication link or the second communication link based on the RLM signal, or monitoring a condition of the one or more beams based on the one or more reference signals.

In an aspect, the information may include at least one of a public warning system (PWS) message, system information (SI) associated with the base station, or an in-device coexistence (IDC) indication associated with the first subscription and the second subscription. In this aspect, the communicating the information at block 1010 may include receiving the at least one of the PWS message, the SI, or the IDC indication to the UE via one of the first communication link and the second communication link. In this aspect, the communicating the information at block 1010 may further include monitoring for at least one of a change in the system information or the PWS message on one of the first communication link and the second communication link.

In an aspect, the information may include UAI associated with the UE. In this aspect, the communicating the information at block 1010 may include transmitting the UAI via the one of the first communication link and the second communication link.

In one configuration, the UE 900 includes means for establishing a first communication link with a base station using a first subscription, means for establishing a second communication link with one of the base station or a second base station using a second subscription, means for coordinating communication of information via at least one of the first communication link or the second communication link, wherein the coordinating the communication comprises selecting, based on the information, one of (a) the first communication link and the second communication link for communicating the information, or (b) the first communication link or the second communication link for communicating the information without utilizing the other communication link, and means for communicating the information via at least one of the first communication or the second communication based on the coordinating. In one aspect, the aforementioned means may be the processor(s) 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the processor-readable storage medium 906, or any other suitable apparatus or means described in any one of the FIGS. 1, 2, 3, and 5, and utilizing, for example, the processes and/or algorithms described herein in relation to FIG. 10.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20. Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-9 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example. "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method of wireless communication by a base station, comprising:

determining that a first communication link and a second communication link are established with a user equipment (UE) using a first subscription and a second subscription of the UE, respectively, wherein at least one of the first communication link or the second communication link is established between the UE and the base station;

coordinating communication of information with the UE via at least one of the first communication link or the second communication link based on the determination, wherein the coordinating the communication of the information comprises selecting, based on a type of the information to be communicated with the UE, either (a) the first communication link and the second communication link for communicating the information, or (b) one of the first communication link and the second communication link for communicating the information without utilizing the other one of the first communication link and the second communication link, wherein the first communication link and the second communication link are available to carry the type of the information; and communicating the information with the UE via the selected first communication link and/or second communication link.

2. The method of claim 1, wherein the determining that the first communication link and the second communication link are established with the UE comprises:

receiving first UE identification information associated with the first communication link and second UE identification information associated with the second communication link via one of the first communication link and the second communication link; and determining that the first and second communication links are associated with the UE in response to determining that the first UE identification information and the second UE identification information are received via the one of the first communication link and the second communication link.

3. The method of claim 2, wherein the first UE identification information includes at least one of a first radio network temporary identifier (RNTI) or a first serving temporary mobile subscriber identity (S-TMSI) associated with the first subscription and the second UE identification information includes at least one of a second RNTI or a second S-TMSI associated with the second subscription.

4. The method of claim 3, wherein the first RNTI is a first cell RNTI (C-RNTI) and the second RNTI is a second C-RNTI.

5. The method of claim 1, wherein the first communication link is established between the UE and the base station and the second communication link is established between the UE and one of the base station and a second base station.

6. The method of claim 5, wherein the base station is associated with a first primary cell (PCell) and the second base station is associated with a second PCell.

7. The method of claim 1, wherein the first communication link is established between the UE and a first distribution unit of the base station, and the second communication link is established between the UE and one of the first distribution unit and a second distribution unit of the base station.

8. The method of claim 1, wherein the information includes first data to be scheduled for the first communication link and second data to be scheduled for the second communication link, and wherein the coordinating the communication of the information comprises:

scheduling the UE to communicate the first data via the first communication link during a first time period; and scheduling the UE to communicate the second data via the second communication link during a second time period different from the first time period.

9. The method of claim 1, wherein the information includes at least one of a radio link monitoring (RLM) signal or radio resource management (RRM) information used for the first subscription and the second subscription, wherein the coordinating the communication of the information comprises selecting, based on the information, the one of the first communication link and the second communication link for communicating the information, and wherein the communicating the information comprises:

transmitting at least one of the RLM signal or the RRM information to the UE via the one of the first communication link and the second communication link.

10. The method of claim 1, wherein the information includes a first handover command and a second handover command, the first handover command requesting the UE to perform a first handover from the base station to a target base station using the first subscription, and the second handover command requesting the UE to perform a second handover from the base station to the target base station using the second subscription, and wherein the communicating the information comprises:

transmitting the first handover command to the UE via the first communication link using the first subscription during a first time period; and transmitting the second handover command to the UE via the second communication link using the second subscription during a second time period which substantially overlaps with the first time period.

11. The method of claim 10, wherein at least one of the first handover or the second handover is a dual active protocol stack (DAPS) handover.

12. The method of claim 10, wherein the first handover command and the second handover command are for a conditional handover to the target base station.

13. The method of claim 1, wherein the information includes at least one of a first configured grant (CG) or a first semipersistent scheduling (SPS) configuration associated with the first subscription and at least one of a second CG or a second semipersistent scheduling (SPS) configuration associated with the second subscription, and wherein the communicating the information comprises:

transmitting the at least one of the first CG or the first SPS configuration to the UE via the first communication link using the first subscription during a first time period; and transmitting the at least one of the second CG or the SPS configuration to the UE via the second communication link using the second subscription during a second time period different from the first time period.

14. The method of claim 1, wherein the information includes at least one of a first physical uplink control channel (PUCCH) information or a first sounding reference signal (SRS) configuration associated with the first subscription and at least one of a second PUCCH information or a second SRS configuration associated with the second subscription, and wherein the communicating the information comprises:

transmitting the at least one of the first PUCCH or the first SRS configuration to the UE via the first communication link using the first subscription based on time division multiplexing; and transmitting the at least one of the second PUCCH or the second SRS configuration to the UE via the second communication link using the second subscription based on the time division multiplexing.

15. The method of claim 1, wherein the information includes a sounding reference signal (SRS) configuration associated with the first subscription and the second subscription, wherein the coordinating the communication of the information comprises selecting, based on the information, the one of the first communication link and the second communication link for communicating the information, and wherein the communicating the information comprises:

transmitting the SRS configuration to the UE via the one of the first communication link and the second communication link.

16. The method of claim 1, wherein the information includes at least one of a public warning system (PWS) message, system information (SI) associated with the base station, or an in-device coexistence (IDC) indication associated with the first subscription and the second subscription, wherein the coordinating the communication of the information comprises selecting, based on the information, the one of the first communication link and the second communication link for communicating the information, and wherein the communicating the information comprises:

transmitting the at least one of the PWS message, the SI, or the IDC indication to the UE via the one of the first communication link and the second communication link.

17. A base station for wireless communication, comprising:

at least one processor;

a transceiver communicatively coupled to the at least one processor; and a memory communicatively coupled to the at least one processor, wherein the processor is configured to:

determine that a first communication link and a second communication link are established with a user equipment (UE) using a first subscription and a second subscription of the UE, respectively, wherein at least one of the first communication link or the second communication link is established between the UE and the base station;

coordinate communication of information with the UE via at least one of the first communication link or the second communication link based on the determination, wherein the at least one processor configured to coordinate the communication of the information is configured to select, based on a type of the information to be communicated with the UE, either (a) the first communication link and the second communication link for communicating the information, or (b) one of the first communication link and the second communication link for communicating the information without utilizing the other one of the first communication link and the second communication link, wherein the first communication link and the second communication link are available to carry the type of the information; and communicate the information with the UE via the selected first communication link and/or second communication link.

18. The base station of claim 17, wherein the at least one processor configured to determine that the first communication link and the second communication link are established with the UE is configured to:

receive first UE identification information associated with the first communication link and second UE identification information associated with the second communication link via one of the first communication link and the second communication link; and determine that the first and second communication links are associated with the UE in response to determining that the first UE identification information and the second UE identification information are received via the one of the first communication link and the second communication link.

19. A non-transitory processor-readable storage medium having instructions for a base station thereon, wherein the instructions, when executed by a processing circuit, cause the processing circuit to:

determine that a first communication link and a second communication link are established with a user equipment (UE) using a first subscription and a second subscription of the UE, respectively, wherein at least one of the first communication link or the second communication link is established between the UE and the base station;

coordinate communication of information with the UE via at least one of the first communication link or the second communication link based on the determination, wherein the instructions to cause the processing circuit to coordinate the communication of information cause the processing circuit to select, based on a type of the information to be communicated with the UE, either (a) the first communication link and the second communication link for communicating the information, or (b) one of the first communication link and the second communication link for communicating the information without utilizing the other one of the first communication link and the second communication link, wherein the first communication link and the second communication link are available to carry the type of the information; and communicate the information with the UE via the selected first communication link and/or second communication link.

20. A method of wireless communication by a user equipment (UE) configured to communicate using multiple subscriptions, comprising:

establishing a first communication link with a base station using a first subscription;

establishing a second communication link with one of the base station or a second base station using a second subscription;

coordinating communication of information via at least one of the first communication link or the second communication link, wherein the coordinating the communication of the information comprises selecting, based on a type of the information to be communicated with the base station, either (a) the first communication link and the second communication link for communicating the information, or (b) one of the first communication link and the second communication link for communicating the information without utilizing the other one of the first communication link and the second communication link, wherein the first communication link and the second communication link are available to carry the type of the information; and communicating the information via at least one of the first communication or the second communication based on the coordinating.

21. The method of claim 20, further comprising:

transmitting first UE identification information associated with the first communication link and second UE identification information associated with the second communication link via one of the first communication link and the second communication link, wherein the coordinating the communication is in response to transmitting the first UE identification information and the second UE identification information via the one of the first communication link and the second communication link.

22. The method of claim 21, wherein the first UE identification information includes at least one of a first radio network temporary identifier (RNTI) or a first serving temporary mobile subscriber identity (S-TMSI) associated with the first subscription and the second UE identification information includes at least one of a second RNTI or a second S-TMSI associated with the second subscription.

23. The method of claim 22, wherein the first RNTI is a first cell RNTI (C-RNTI) and the second RNTI is a second C-RNTI.

24. The method of claim 20, wherein the base station is associated with a first primary cell (PCell) and the second base station is associated with a second PCell.

25. The method of claim 20, wherein the first communication link is established between the UE and a first distribution unit of the base station, and the second communication link is established between the UE and one of the first distribution unit and a second distribution unit of the base station.

26. The method of claim 20, wherein the information includes a cell identification information associated with the second base station, wherein the coordinating the communication of the information comprises selecting, based on the information, the one of the first communication link and the second communication link for communicating the information, and wherein the communicating the information comprises:

transmitting the cell identification information to the base station via the one of the first communication link and the second communication link.

27. The method of claim 20, wherein the information includes a radio resource control (RRC) status report associated with at least one of the first communication link or the second communication link, wherein the coordinating the communication of the information comprises selecting, based on the information, the one of the first communication link and the second communication link for communicating the information, and wherein the communicating the information comprises:

transmitting the RRC status report via the one of the first communication link and the second communication link.

28. The method of claim 20, wherein the information includes UE radio access network (RAN) capability information associated with the UE, wherein the coordinating the communication of the information comprises selecting, based on the information, the one of the first communication link and the second communication link for communicating the information, and wherein the communicating the information comprises:

transmitting the UE RAN capability information via the one of the first communication link and the second communication link.

29. The method of claim 20, wherein the information includes at least one of radio link monitoring (RLM) signal for monitoring a link quality or one or more reference signals associated with one or more beams, wherein the coordinating the communication of the information comprises selecting, based on the information, the one of the first communication link and the second communication link for communicating the information, and wherein the communicating the information comprises:

receiving the at least one of the RLM signal or the one or more reference signals via the one of the first communication link and the second communication link.

30. The method of claim 29, wherein the communicating the information further comprises performing at least one of:

monitoring a condition of at least one of the first communication link or the second communication link based on the RLM signal, or monitoring a condition of the one or more beams based on the one or more reference signals.

31. The method of claim 20, wherein the information includes at least one of a public warning system (PWS) message, system information (SI) associated with the base station, or an in-device coexistence (IDC) indication associated with the first subscription and the second subscription, wherein the coordinating the communication of the information comprises selecting, based on the information, the one of the first communication link and the second communication link for communicating the information, and wherein the communicating the information comprises:

receiving the at least one of the PWS message, the SI, or the IDC indication via the one of the first communication link and the second communication link.

32. The method of claim 31, wherein the communicating the information further comprises:

monitoring for at least one of a change in the SI or the PWS message on the one of the first communication link and the second communication link.

33. The method of claim 20, wherein the information includes UE assistance information (UAI) associated with the UE, wherein the coordinating the communication of the information comprises selecting, based on the information, the one of the first communication link and the second communication link for communicating the information, and wherein the communicating the information comprises:

transmitting the UAI via the one of the first communication link and the second communication link.

34. A user equipment (UE) for wireless communication, comprising:

at least one processor;

a transceiver communicatively coupled to the at least one processor; and a memory communicatively coupled to the at least one processor, wherein the processor is configured to:

establish a first communication link with a base station using a first subscription;

establish a second communication link with one of the base station or a second base station using a second subscription;

coordinate communication of information via at least one of the first communication link or the second communication link, wherein the at least one processor configured to coordinate the communication of the information is configured to select, based on a type of the information to be communicated with the base station, either (a) the first communication link and the second communication link for communicating the information, or (b) one of the first communication link and the second communication link for communicating the information without utilizing the other one of the first communication link and the second communication link, wherein the first communication link and the second communication link are available to carry the type of the information; and communicate the information via at least one of the first communication or the second communication based on the coordinating.

35. The UE of claim 34, wherein the at least one processor is further configured to:

transmit first UE identification information associated with the first communication link and second UE identification information associated with the second communication link via one of the first communication link and the second communication link, wherein the at least one processor is configured to coordinate the communication is in response to transmitting the first UE identification information and the second UE identification information via the one of the first communication link and the second communication link.

* * * * *